(12) United States Patent
Cook et al.

(10) Patent No.: US 8,855,554 B2
(45) Date of Patent: Oct. 7, 2014

(54) PACKAGING AND DETAILS OF A WIRELESS POWER DEVICE

(75) Inventors: Nigel P. Cook, El Cajon, CA (US); Lukas Sieber, Olten (CH); Hanspeter Widmer, Solothurn (CH)

(73) Assignee: QUALCOMM Incorporated, San Diego, CA (US)

( * ) Notice: Subject to any disclaimer, the term of this patent is extended or adjusted under 35 U.S.C. 154(b) by 896 days.

(21) Appl. No.: 12/398,179

(22) Filed: Mar. 4, 2009

(65) Prior Publication Data

US 2009/0243397 A1 Oct. 1, 2009

Related U.S. Application Data

(60) Provisional application No. 61/034,116, filed on Mar. 5, 2008.

(51) Int. Cl.
*H04B 5/00* (2006.01)
(52) U.S. Cl.
USPC .......................................... 455/41.1; 307/104
(58) Field of Classification Search
None
See application file for complete search history.

(56) References Cited

U.S. PATENT DOCUMENTS

| | | | | |
|---|---|---|---|---|
| 3,743,974 A * | 7/1973 | Sheffield | ............... | 333/17.1 |
| 4,799,066 A * | 1/1989 | Deacon | ............... | 343/861 |
| 5,195,045 A * | 3/1993 | Keane et al. | ............... | 702/107 |
| 5,297,664 A | 3/1994 | Tseng et al. | | |
| 5,396,251 A * | 3/1995 | Schuermann | ............... | 342/51 |
| 5,399,955 A * | 3/1995 | Glaser et al. | ............... | 323/208 |
| 5,446,447 A * | 8/1995 | Carney et al. | ............... | 340/572.4 |
| 5,519,262 A | 5/1996 | Wood | | |
| 5,680,106 A * | 10/1997 | Schrott et al. | ............... | 340/10.33 |
| 5,689,355 A | 11/1997 | Okubo et al. | | |
| 5,726,551 A | 3/1998 | Miyazaki et al. | | |
| 5,854,481 A * | 12/1998 | Ricotti et al. | ............... | 235/492 |
| 5,991,608 A | 11/1999 | Leyten | | |
| 6,057,668 A | 5/2000 | Chao | | |
| 6,070,803 A * | 6/2000 | Stobbe | ............... | 235/492 |
| 6,094,084 A | 7/2000 | Abou-Allam et al. | | |
| 6,127,799 A | 10/2000 | Krishnan | | |
| 6,134,130 A | 10/2000 | Connell et al. | | |
| 6,161,762 A * | 12/2000 | Bashan et al. | ............... | 235/492 |
| 6,211,753 B1 * | 4/2001 | Leifso et al. | ............... | 333/214 |
| 6,291,968 B1 | 9/2001 | Nantz et al. | | |

(Continued)

FOREIGN PATENT DOCUMENTS

DE 102007010896 A1 9/2008
EP 0977304 A1 2/2000

(Continued)

OTHER PUBLICATIONS

"Wireless Non-Radiative Energy Transfer", MIT paper, publication and date unknown, believed to be 2007.

(Continued)

*Primary Examiner* — Thomas J Hiltunen
(74) *Attorney, Agent, or Firm* — Knobbe, Martens, Olson & Bear, LLP

(57) ABSTRACT

A wireless power system includes a power source, power receiver, and components thereof. The system can also include a parasitic antenna that can improve the coupling to the power source in various modes. The antenna can have both a variable capacitor and a variable inductor, and both of those can be changed in order to change characteristics of the matching.

29 Claims, 14 Drawing Sheets

(56) References Cited

U.S. PATENT DOCUMENTS

| | | | |
|---|---|---|---|
| 6,316,909 B1 | 11/2001 | Honda et al. | |
| 6,321,067 B1* | 11/2001 | Suga et al. | 455/41.2 |
| 6,424,232 B1* | 7/2002 | Mavretic et al. | 333/17.3 |
| 6,427,065 B1* | 7/2002 | Suga et al. | 455/41.1 |
| 6,480,110 B2* | 11/2002 | Lee et al. | 340/572.5 |
| 6,498,455 B2 | 12/2002 | Zink et al. | |
| 6,515,919 B1* | 2/2003 | Lee | 365/192 |
| 6,556,415 B1* | 4/2003 | Lee et al. | 361/277 |
| 6,624,743 B1* | 9/2003 | Ikefuji et al. | 340/10.4 |
| 6,650,213 B1 | 11/2003 | Sakurai et al. | |
| 6,840,440 B2* | 1/2005 | Uozumi et al. | 235/375 |
| 6,889,905 B2 | 5/2005 | Shigemasa et al. | |
| 6,906,495 B2 | 6/2005 | Cheng et al. | |
| 6,992,366 B2* | 1/2006 | Kim et al. | 257/531 |
| 7,009,860 B2 | 3/2006 | Kazutoshi | |
| 7,023,395 B2* | 4/2006 | Ohara et al. | 343/788 |
| 7,084,605 B2* | 8/2006 | Mickle et al. | 320/101 |
| 7,167,090 B1* | 1/2007 | Mandal et al. | 340/538.14 |
| 7,256,695 B2* | 8/2007 | Hamel et al. | 340/572.1 |
| 7,283,922 B2* | 10/2007 | Kurtz et al. | 702/138 |
| 7,426,373 B2 | 9/2008 | Clingman et al. | |
| 7,548,040 B2 | 6/2009 | Lee et al. | |
| 7,570,220 B2* | 8/2009 | Hall et al. | 343/745 |
| 7,714,537 B2 | 5/2010 | Cheng et al. | |
| 7,741,734 B2 | 6/2010 | Joannopoulos et al. | |
| 7,762,471 B2* | 7/2010 | Tanner | 235/492 |
| 7,825,543 B2 | 11/2010 | Karalis et al. | |
| 7,863,859 B2 | 1/2011 | Soar | |
| 7,880,337 B2 | 2/2011 | Farkas | |
| 7,975,921 B2* | 7/2011 | Mani et al. | 235/441 |
| 8,070,070 B2* | 12/2011 | Taniguchi et al. | 235/492 |
| 8,447,234 B2 | 5/2013 | Cook et al. | |
| 2004/0130915 A1* | 7/2004 | Baarman | 363/21.02 |
| 2004/0204781 A1 | 10/2004 | Hsien | |
| 2005/0127867 A1 | 6/2005 | Calhoon et al. | 320/108 |
| 2005/0131495 A1 | 6/2005 | Parramon et al. | 607/61 |
| 2005/0151575 A1* | 7/2005 | Sibrai et al. | 327/334 |
| 2006/0207753 A1 | 9/2006 | Sanatgar et al. | |
| 2007/0021140 A1 | 1/2007 | Keyes et al. | |
| 2007/0058402 A1* | 3/2007 | Shekhawat et al. | 363/89 |
| 2007/0164122 A1* | 7/2007 | Ju | 235/492 |
| 2007/0171681 A1* | 7/2007 | Baarman | 363/16 |
| 2007/0197180 A1* | 8/2007 | McKinzie et al. | 455/248.1 |
| 2007/0207753 A1 | 9/2007 | Byun | |
| 2007/0222542 A1 | 9/2007 | Joannopoulos | |
| 2007/0236851 A1* | 10/2007 | Shameli et al. | 361/113 |
| 2007/0267918 A1 | 11/2007 | Gyland | |
| 2007/0285255 A1* | 12/2007 | Tsushima et al. | 340/572.7 |
| 2007/0296548 A1* | 12/2007 | Hall et al. | 340/10.1 |
| 2007/0298846 A1 | 12/2007 | Greene et al. | |
| 2008/0067874 A1 | 3/2008 | Tseng | |
| 2008/0116846 A1 | 5/2008 | Greenfeld et al. | |
| 2008/0116990 A1* | 5/2008 | Rokhsaz | 333/32 |
| 2008/0162973 A1 | 7/2008 | Landry et al. | |
| 2008/0165074 A1 | 7/2008 | Terry | |
| 2008/0191897 A1 | 8/2008 | Mccollough | 340/625.22 |
| 2008/0211455 A1 | 9/2008 | Park et al. | |
| 2008/0238364 A1 | 10/2008 | Weber et al. | |
| 2008/0238632 A1 | 10/2008 | Endo et al. | |
| 2008/0272889 A1* | 11/2008 | Symons | 340/10.1 |
| 2008/0278264 A1 | 11/2008 | Karalis et al. | |
| 2008/0315826 A1 | 12/2008 | Alberth, Jr. et al. | |
| 2009/0058361 A1 | 3/2009 | John | |
| 2009/0102296 A1 | 4/2009 | Greene et al. | |
| 2009/0111531 A1 | 4/2009 | Cui et al. | |
| 2009/0140691 A1 | 6/2009 | Jung | |
| 2009/0146892 A1 | 6/2009 | Shimizu et al. | |
| 2009/0224608 A1* | 9/2009 | Cook et al. | 307/104 |
| 2009/0257259 A1* | 10/2009 | Leibovitz | 363/89 |
| 2009/0284218 A1 | 11/2009 | Mohammadian et al. | |
| 2009/0284369 A1 | 11/2009 | Toncich et al. | |
| 2009/0286475 A1 | 11/2009 | Toncich et al. | |
| 2009/0286476 A1 | 11/2009 | Toncich et al. | |
| 2010/0123429 A1 | 5/2010 | Chen et al. | |
| 2010/0148723 A1 | 6/2010 | Cook et al. | |
| 2010/0181961 A1 | 7/2010 | Novak et al. | |
| 2011/0234011 A1 | 9/2011 | Yi et al. | |
| 2011/0241437 A1 | 10/2011 | Kanno | |
| 2011/0266882 A1 | 11/2011 | Yamamoto et al. | |
| 2012/0038220 A1 | 2/2012 | Kim et al. | |
| 2012/0049642 A1 | 3/2012 | Kim et al. | |
| 2012/0153731 A9* | 6/2012 | Kirby et al. | 307/104 |
| 2012/0262004 A1 | 10/2012 | Cook et al. | |

FOREIGN PATENT DOCUMENTS

| | | |
|---|---|---|
| EP | 1986304 A2 | 10/2008 |
| GB | 2422517 A | 7/2006 |
| JP | S56116738 U | 9/1981 |
| JP | 06133476 | 5/1994 |
| JP | 8501435 A | 2/1996 |
| JP | 9103037 A | 4/1997 |
| JP | 10145987 A | 5/1998 |
| JP | H10280761 A | 10/1998 |
| JP | H11134566 A | 5/1999 |
| JP | H11508435 A | 7/1999 |
| JP | 2001005938 A | 1/2001 |
| JP | 2001238372 A | 8/2001 |
| JP | 2001307032 A | 11/2001 |
| JP | 2002078247 A | 3/2002 |
| JP | 2002354712 A | 12/2002 |
| JP | 2004166384 A | 6/2004 |
| JP | 2004215477 A | 7/2004 |
| JP | 2005149238 A | 6/2005 |
| JP | 2005208754 A | 8/2005 |
| JP | 2005261187 A | 9/2005 |
| JP | 2005300219 A | 10/2005 |
| JP | 2007089341 A | 4/2007 |
| JP | 2007125926 A | 5/2007 |
| JP | 2009500999 A | 1/2009 |
| KR | 20000011967 A | 2/2000 |
| KR | 1020060122217 | 11/2006 |
| KR | 20070032271 A | 3/2007 |
| TW | I347724 | 8/2011 |
| WO | WO0195432 A1 | 12/2001 |
| WO | WO2004032349 | 4/2004 |
| WO | WO2007008608 A2 | 1/2007 |
| WO | 2007084716 A2 | 7/2007 |
| WO | WO2007084717 | 7/2007 |
| WO | WO2007089086 A1 | 8/2007 |
| WO | WO2007090168 A2 | 8/2007 |
| WO | WO2007095267 | 8/2007 |
| WO | 2007119316 A1 | 10/2007 |
| WO | WO2007150070 A2 | 12/2007 |
| WO | WO2008017818 A1 | 2/2008 |
| WO | WO2008133388 A1 | 11/2008 |

OTHER PUBLICATIONS

"Efficient wireless non-radiative mid-range energy transfer", MITpaper, publication and date unknown, believed to be 2007.

"Wireless Power Transfer via Strongly Coupled Magnetic Resonances", Kurs et al, Science Express, Jun. 7, 2007.

"Wireless Power Transfer via Strongly Coupled Magnetic Resonances", Kurs et al, scimag.org, Jul. 6, 2007.

Joung, et al., "An Energy Transmission System for an Artificial Heart Using Leakage Inductance Compensation of Transcutaneous Transformer", IEEE Transactions on Power Electronics, vol. 13, No. 6, Nov. 1998, pp. 1013-1022.

Karalis, A. et al., "Efficient wireless non-radiative mid-range energy transfer", Science Direct, Annals of physics, 323(1), pp. 34-48, (Jan. 2008).

International Search Report and Written Opinion—PCT/US2009/036090, International Search Authority—European Patent Office—Oct. 16, 2009.

* cited by examiner

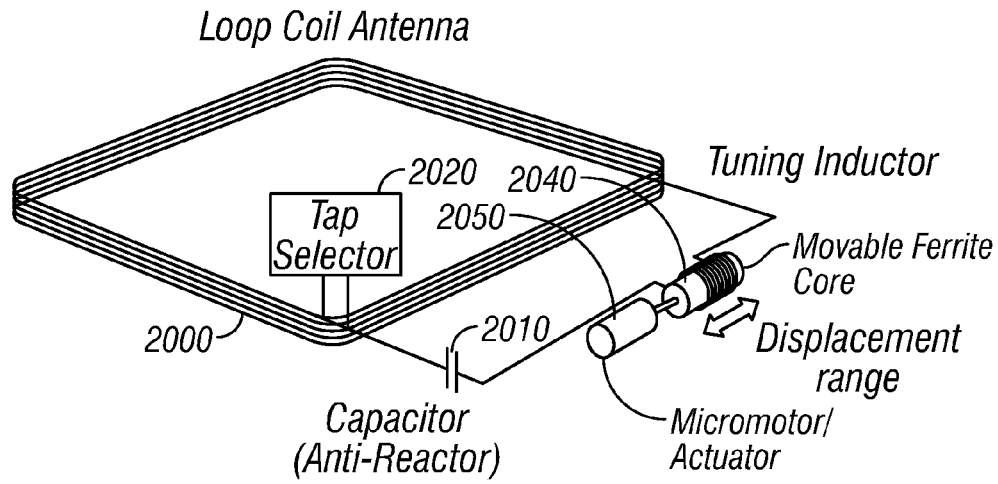
FIG. 20
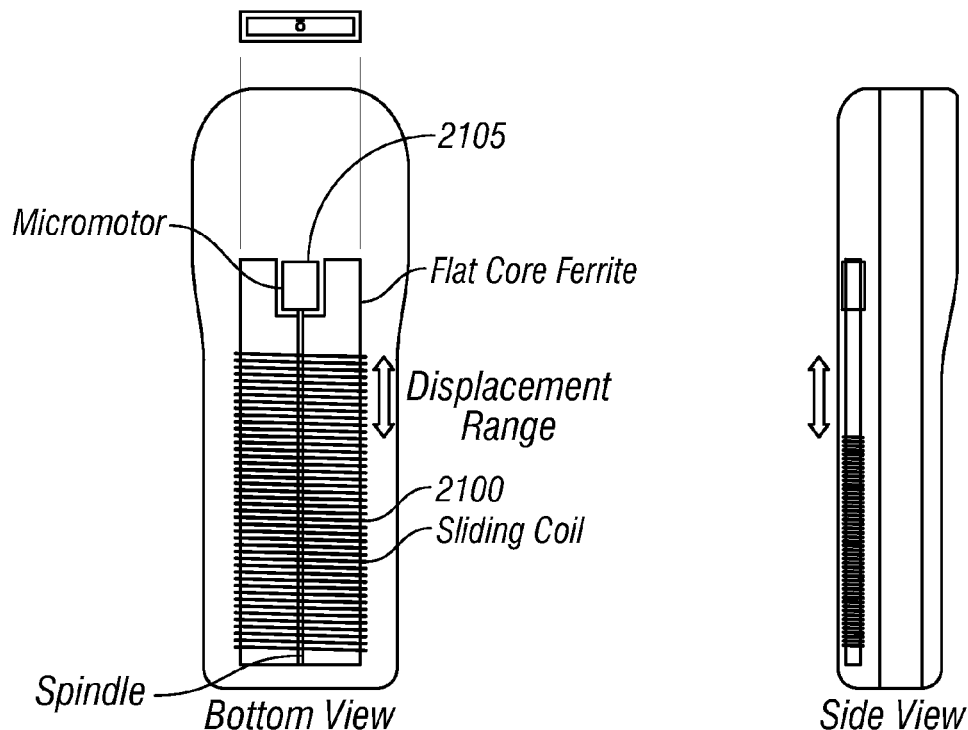
FIG. 21A  FIG. 21B

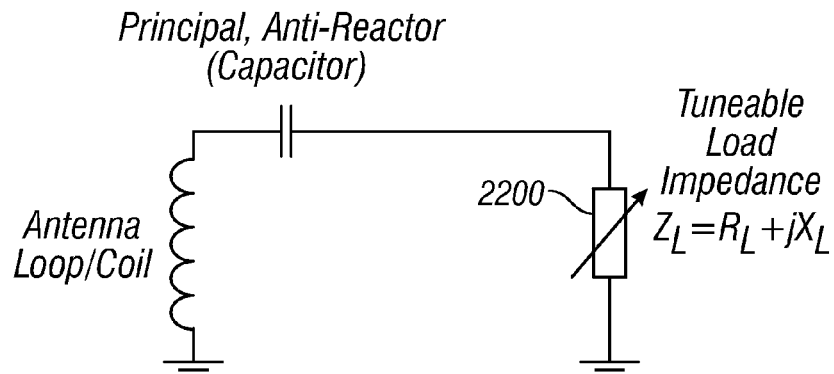
FIG. 22
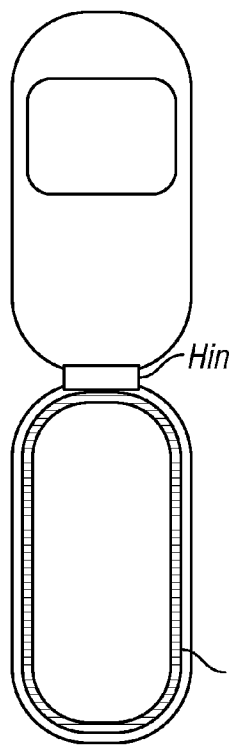
Clamp Shell Type:
Antenna Loop
Integrated into
Cover or Keyboard Part
FIG. 22A
Compact Type:
Antenna Loop
Integrated into
Main Part
FIG. 22B
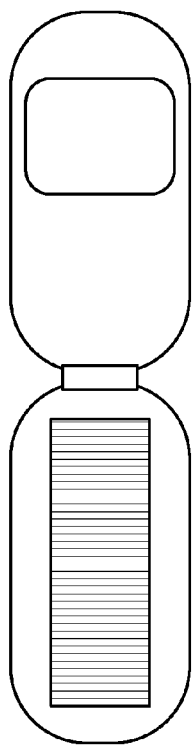
Clamp Shell Type:
Ferrite Flat Core Antenna
Integrated into Cover
or Keyboard Part
FIG. 22C
Compact Type:
Ferrite Flat Core
Antenna
Integrated into
Main Part
FIG. 22D

PACKAGING AND DETAILS OF A WIRELESS POWER DEVICE

This application claims priority from provisional application No. 61/034,116, filed Mar. 5, 2008, the entire contents of which are herewith incorporated by reference.

BACKGROUND

The number of battery powered electronic devices and gadgets used in daily life is steadily increasing. Important such devices include:

Communications handsets: mobile phones, cordless phones

Infotainement: Music (MP3) players (diskman, ipod, etc.), Mobile TV, portable audio broadcast receivers Photo/video: Digi/video cams Wireless peripherals: Bluetooth headsets, cordless microphones, etc.

Time & navigation: wrist watches/computers, GPS devices

IT: PADs, Laptops, cordless keyboards & mice, etc.

Household: Electronic clocks, thermometer, weather stations, pocket calculators, etc.

Medical: hearing aids, cardiac pacemakers, etc.

Sport: stopwatches, avalanche beacons, bike computers, bike lamps, pocket lamps, pulse monitors, etc.

Wireless communications has brought certain freedom from wires for the communication. However, recharging of those devices still requires wires. Many other electronic devices use non rechargeable batteries requiring frequent replacement producing an environmental burden. To make matters worse, there is no true standard charging interface. Many different re-chargeable devices require their own wall charger.

Battery technologies have improved, but Personal Electronic Devices (PEDs) in average are getting more power-hungry due to added features and increased usage (e.g. mobile phone with integrated digicam, colour screen, gaming and MP3 players), thus effectively resulting in reduced instead of expanded autonomy time.

Getting power to portable devices has been the focus of a series of recent products that attempt to resolve traditional charging frustrations. This includes wind-up chargers, zinc-air power packs, USB chargers and multi-tipped universal chargers. These form niche market sectors, but none has met with widespread success.

Our previous applications and provisional applications, including, but not limited to, U.S. patent application Ser. No. 12/018,069, filed Jan. 22, 2008, entitled "Wireless Apparatus and Methods", the disclosure of which is herewith incorporated by reference, describe wireless transfer of power.

The transmit and receiving antennas are preferably resonant antennas, which are substantially resonant, e.g., within 10% of resonance, 15% of resonance, or 20% of resonance. The antenna is preferably of a small size to allow it to fit into a mobile, handheld device where the available space for the antenna may be limited. An embodiment describes a high efficiency antenna for the specific characteristics and environment for the power being transmitted and received.

One embodiment uses an efficient power transfer between two antennas by storing energy in the near field of the transmitting antenna, rather than sending the energy into free space in the form of a travelling electromagnetic wave. This embodiment increases the quality factor (Q) of the antennas. This can reduce radiation resistance ($R_r$) and loss resistance ($R_l$).

In one embodiment, two high-Q antennas are placed such that they react similarly to a loosely coupled transformer, with one antenna inducing power into the other. The antennas preferably have Qs that are greater than 1000.

SUMMARY

The present application describes use and applications of wireless power.

Aspects include tuning of wireless antennas, and packaging of those antennas.

BRIEF DESCRIPTION OF THE DRAWINGS

FIGS. 16-21 show different ways of varying the tuning of the antenna;

FIG. 22 shows electronic resistance;

FIGS. 22A-22B show integration of in the antenna loop into a cover or keyboard part; and FIGS. 22C and 22D show ferrite cores integrated into claimshell and compact devices respectively.

DETAILED DESCRIPTION

People typically just want to use electronic devices and do not want to worry about charging them. For most people, charging and replacing batteries have become another chore in their day-to-day routines.

People need to remember to change their batteries and also to have the right charger at hand. They need to free up wall sockets to plug in. Discharged batteries lead to unreliability of phones, mice and keyboards. To charge multiple devices, users carry multiple different chargers and cables.

The inventors recognize a need for a sustainable infrastructure that can be used commonly as a standard. A universal standard for powering portable devices could have huge benefits to both consumers and to OEMs, the latter of whom could reduce prices by omitting chargers when they sell their products.

Establishing a universal power standard has in the past been constrained partly by the mechanics of device connectors or charging contacts. These can vary among devices. Different devices may also have different power requirements.

Wireless power as defined by this application can sidestep many of these issues. An embodiment describes inductive coupling based on time variant (AC) magnetic fields. Wireless power avoids wires, connectors or contacts between the powering station and the device. Another advantage is that this system provides hermetically sealed (waterproof) electronic devices. This solution can charge multiple devices with different power requirements, all at the same time.

Wireless power technology can create a new infrastructure so that people have opportunities to recharge their electronic devices in shared locations. Anyone within a zone could recharge, without the need for multiple chargers. A wireless charging zone may be in a friend's house, a cafe, restaurant, hotel or airport lounge. Wherever people go, they would know that they can re-power all their devices.

Figure 1:
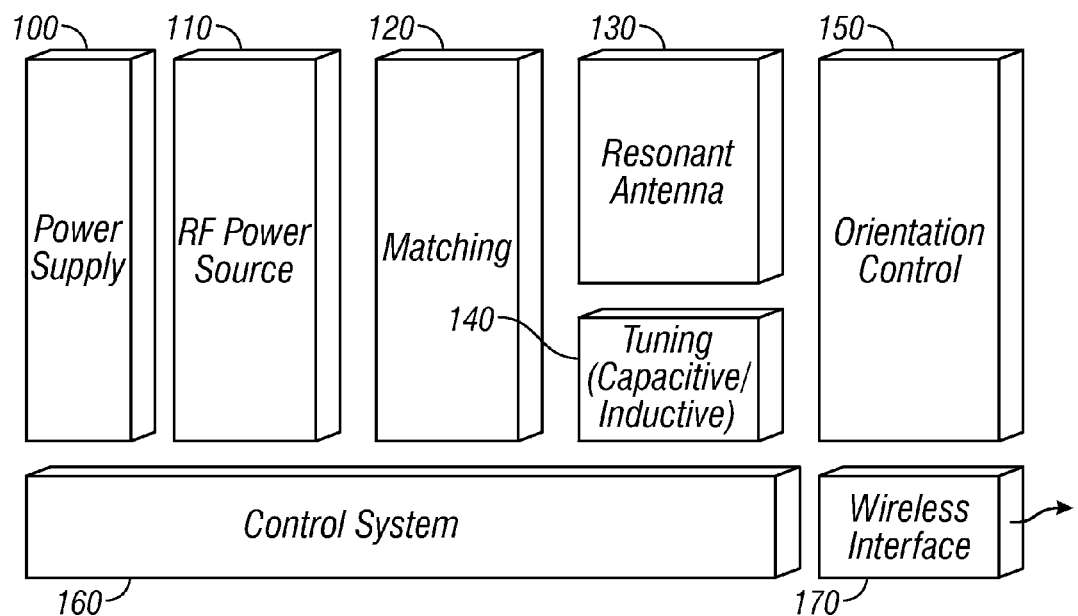
FIG. 1 shows a block diagram of an energy transmitter for wireless control.

The generic wireless energy source consists of the following subsystem parts and functions as shown in FIG. 1. A power supply 100 receives a source of power, e.g., from a wall socket. This is used to modulate power on an RF power source 110, that produces power at a specified RF frequency. A matching circuit 120 matches the RF output to the resonant antenna 130, to minimize the impedance mismatches. The antenna may itself have tuning 140 and orientation control 150 that can control characteristics of the transmission.

A control system 160 controls the operation. A wireless interface 170 may couple the wireless power.

Each of these subsystems is described in detail herein.

The power supply 100, can generally be a high efficiency switched-mode power supply to produce a DC voltage to drive the RF power stage 110. Very high conversion efficiencies (>95%) can be achieved. Depending on application, an AC/DC converter or a DC/DC converter (e.g. for automotive applications) may be used. For the transmitter's own control functions, a constant voltage but low wattage may also be used, e.g., a 5 v or 12V supply.

In special solutions/applications the power supply may be omitted or may be only a rectifier.

An adaptive system may adaptively control this voltage level using the control system 160.

The RF power source 110 may be a non-linear high-efficiency power stage using power switches (Transistors, FETs, etc.) driven by a square wave oscillator. For vicinity coupling systems operated with higher magnetic field strength the use of a frequency reference, such as generated from a crystal oscillator, may be preferable with respect to frequency regulatory issues. A common frequency may be defined on an international basis for such applications e.g. at 13.56 MHz (ISM-band) in the HF band
around 135 kHz (ISM-band) in the LF band Frequency generation may however be considered as part of the control system.

For transmitters operating in the VLF/LF range, a power efficient half-bridge 'inverter' circuit is typically used. This stage may be modeled by a low impedance source (voltage source) with a rectangular waveform, although this can alternatively be any other kind of waveform.

The antenna current as generated by the rectangular voltage waveform will be smoothed by the resonant antenna circuit into a sinusoid. The resonant circuit may inherently suppress harmonics emissions.

In certain cases, however such as a receiver with close proximity coupling, the loaded Q-factor may become so low that there is no significant wave shaping effect. This increases the bandwidth of the device. In such case however, lower harmonic radiation would be expected since antenna currents on transmitter and receiver will drop to low levels also partially compensating themselves. To a certain extent, harmonic radiation potential and the wave shaping effect are related, so that harmonic radiation may always be kept below any unwanted emission limits.

Power and efficiency control may be accomplished through changing the DC supply power and/or the duty cycle of a signal, e.g., a square wave, driving the 'inverter'.

In one embodiment, an antenna matching system is used.

In another embodiment, no specific antenna matching circuit may be required in the transmitter. Assuming a loop/coil antenna the use of a capacitor as an anti-reactor to compensate for the inductive reactance of the loop/coil may be sufficient to compensate. The output of the low impedance RF power source may be directly connected to the resonant tank circuit (series resonant circuit). To preserve high efficiency, this requires the source impedance (resistance) of the RF power stage to be considerably lower than the resonance resistance of the tank circuit, such that only a small percentage of generated power is dissipated in the source resistance. The source-to-resonance resistance ratio may be controlled to a certain extend through antenna design parameters (L/C ratio).

The system also uses a resonant antenna 130. In a magnetically (inductively) coupled system, the antenna is generally a multi-turn loop (coil). At higher frequencies, single turn loops may be used. The antenna coil may be designed to withstand the high voltages and currents resulting when the transmitter subsystem is unloaded, e.g., when no receivers are within range. It must provide a Q-factor as high as possible since this Q-factor will limit transfer efficiency at the fringe of service coverage and range.

It is expected that in a practical system implementation, Q-factors up to 300 are achievable at LF and up to 600 in the HF frequency range (13.6 MHz). In non-integrated laboratory samples Q-factors twice as high may be achievable.

Copper tube or silver plated copper tube may be adequate material to build a HF loop. At LF, thin well insulated wire or thicker stranded wire (litz wire) may be used, depending on the targeted L/C ratio and the power rating. At LF, the antenna coil may provide taps for matching or tuning purposes. At HF, the use of a special coupling loop/coil (acting as an up-transformer) may be used to match to the impedance of the antenna and prevent loading effects from the circuit.

Assuming a fixed and defined operating frequency, e.g., a frequency that is crystal controlled, tuning of the resonance frequency antenna can compensate for detuning effects caused by:

extraneous objects (metallic objects at LF and metallic and dielectric objects at HF)
detuned power receivers in close proximity, and/or
variation of source impedances.

Tuning may also compensate for component tolerances, ageing, etc.

In one embodiment, tuning is automatically executed by the transmitter's control system according to a defined procedure. A fractional tuning range in the order of +/−10% may be desirable and also sufficient in most scenarios.

Tuning can be capacitive or inductive or both. Capacitive tuning may be accomplished by using mechanically tuneable capacitors, e.g., driven by mini-motor/actuator. It can use electrically tuneable capacitors which tune using dielectric permittivity tuning or using voltage-dependent capacitance such as varactor diodes. It can be a Capacitor bank and electronic or mechanical switches such as RF relays.

Varactor diode tuning may be limited at high voltages, and may deteriorate the antenna Q-factor and cause harmonics.

Inductive tuning at LF may be accomplished through tapping the antenna coil and using mechanical or electronic switches as tap selectors. A tuneable inductor using a movable Ferrite core driven by mini-motor/actuator or permeability tuning using DC current biasing may be used for fine tuning.

Another embodiment of fine tuning may introduce a second loop/coil and alter the coupling factor to the main loop/coil by shape or orientation, using the so-called Variometer principle.

Another embodiment may change the coupling between the ferrite core and the inductor electronically, or some other way, without physically moving the inductor relative to the ferrite core. While physical movement may be one way of changing the coupling, magnetic fields, or some other way of adjusting the coupling can be used.

Electronically emulated reactance tuning may also be used. This emulates a positive and negative reactance, thus decreasing and increasing a resonant frequency of a tank circuit.

In certain applications, it may be desirable to control orientation of the transmit loop to maximize energy transfer to a receiver that is arbitrarily positioned or oriented. The orientation control 170 can change the physical or simulated orientation of the transmission. Alternatively, two or three magnetic field components with orthogonal polarization may be generated. The sum field vector rotates, preventing from reception minima at any receiver orientation and position.

The control system 160 handles all of:
antenna tuning control
power and efficiency control
frequency generation
other housekeeping functions (e.g. system calibration, etc.)
radiation exposure control In many applications, the position and orientation (coupling factor) of receiver(s) may change. The system can then adapt to the different scenarios in order to satisfy power demand(s) of each receiver and to maximize overall system efficiency. In a single receiver system, both transmitter and receiver may adapt independently, converging in maximum transfer efficiency. One embodiment can operate without feedback signalling from the receiver to optimally adjust the transmitter parameters. The transmitter control system may simulate using local models of the LC circuit and may also simulate or estimate values of the receiver circuit. The transmitter control system may determine the model parameters using specific measurements such as antenna current and voltage, input power, and calibration routines. The model may be used to optimize transfer efficiency and/or to satisfy some minimum power demand of the receiver. For example, by sensing the current flow in the transmit antenna, the model can determine information about the receive system.

The multiple receiver scenario imposes a more complex system. One solution can include feedback signalling from receivers.

The system can also control the radiation exposure. For example, the system can control reducing the transmitted power when persons are approaching the transmit antenna.

A wireless interface 170 may be provided, e.g., for:
Device detection, identification, authentication, or
Communications/signalling between power transmitter and power receiver (device)

Detection, identification and authentication of an energy receiving device may be used as analogs to remote sensing systems such as RFID systems. The communication can be bidirectional or unidirectional.

Data communications/signalling between energy source and energy sink may use the power carrier as a communication carrier. Higher Q factor channels will have only limited bandwidth available, which will in turn limit modulation index and/or transmission speed.

Another signaling alternative may use wireless communication such as Bluetooth, Zigbee, etc. operating in other bands. Many portable devices already support such wireless interfaces for use for their own communication. In another embodiment, these interfaces are used by the energy transfer system for feedback, in addition to their use for communication by the portable device.

Figure 2:
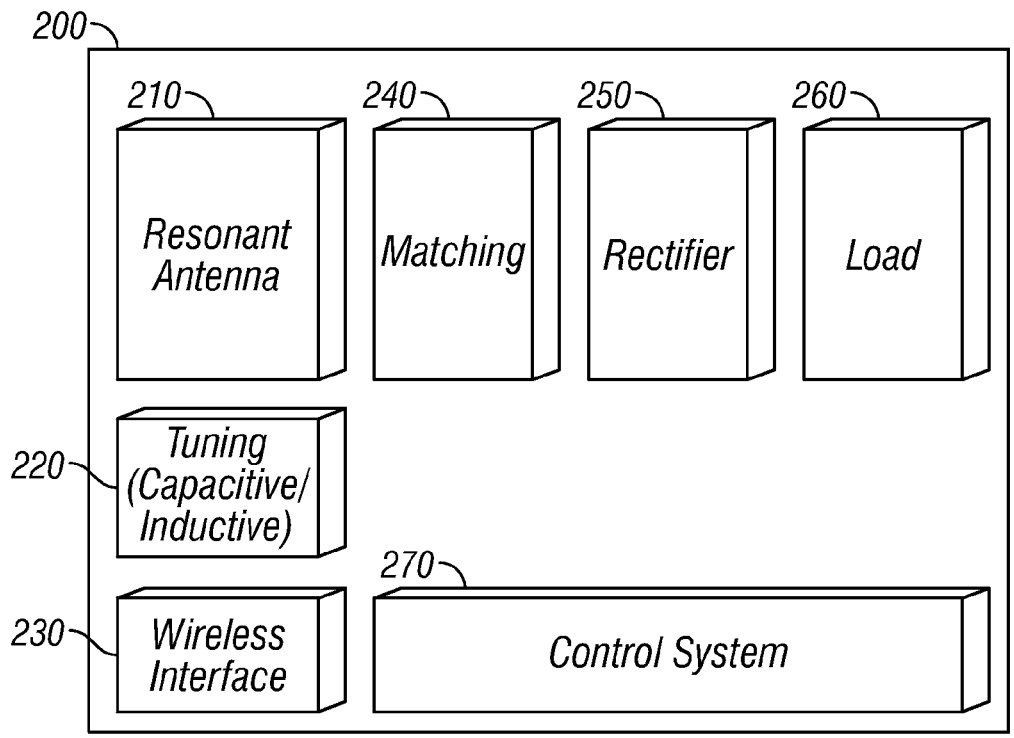
FIG. 2 shows a block diagram of the energy receiver for wireless power.

The receiver is shown generically in FIG. 2 and includes similar parts to those of the transmitter of FIG. 1, in essentially reverse order. Specifically, the receiver includes a resonant antenna 210, tuning 220, matching 240, rectifier 250, load 260, control system 270, and wireless interface 230. Each of these subsystems are described in detail herein.

In a magnetically/inductively coupled system, the antenna 210 is generally a multi-turn loop of wire. At LF the magnetic antenna may include a ferromagnetic or ferrimagnetic core e.g. a Ferrite rod antenna. At higher frequencies (HF) multi-turn loops may be used. The antenna coil should withstand the high voltages and currents resulting when the receiver subsystem is operated at a highest loaded Q or in close proximity of a transmitter. The Q-factor sets the transfer efficiency, and higher Q factors improve the distance over which the power can be received. Eddy currents and dielectric losses in the surrounding of a receive antenna will deteriorate its Q-factor. This is particularly true if the antenna is integrated into a device.

Q-factors up to 150 may be typical at LF and up to 200 in the HF frequency range (13.6 MHz). In non-integrated laboratory samples, Q-factors twice as high may be achievable.

Similar materials can be used as described above.

At LF, the antenna coil may provide taps for matching or tuning purposes. At HF, the use of a special coupling loop/coil may be used to match to the impedance of the antenna.

Assuming a fixed operating frequency defined by the energy transmitter, tuning of the antenna's resonance frequency may compensate for detuning effects caused by
extraneous objects (metallic objects at LF and metallic and dielectric objects at HF)
detuned power receivers in close proximity
variation of load impedance Tuning may also compensate for component tolerances, aging, etc.

Tuning can be automatically executed by the receiver's control system according to a defined procedure.

A fractional tuning range in the order of +/−10% may be desirable and also sufficient in most scenarios.

The resonant antenna can be changed by varying by antireactance (capacitance), or reactance of the inductive part of the antenna system.

Capacitive tuning may be accomplished by
mechanically tuneable capacitors (driven by mini-motor/actuator)
electrically tuneable capacitors (dielectric permittivity tuning) or by
Capacitor bank (library) and electronic or mechanical switches (RF relays)

Inductive tuning can also be used as above, e.g., by tapping the antenna coil and using mechanical or electronic switches (tap selectors). A tuneable inductor using movable Ferrite core driven by mini-motor/actuator or permeability tuning using DC current biasing may be used for fine tuning.

Electronically emulated reactance tuning may also be used as above.

Matching can also be used as above.

In high coupling factor conditions, the rectifier/load may be inserted into the series tank circuit in a similar way to the transmitter. However, in low coupling factor conditions the optimum load resistance that maximizes the power into the load approaches the resonance resistance of the receiver's tank circuit. This value might be as low as a few Ohms, depending on the tank circuit's L/C ratio. A special matching using either a special coupling loop and/or a tapped antenna coil, and/or a capacitive voltage divider may be used to transform the impedance imposed by the rectifier/load.

The rectifier 250 converts the AC power induced into the receiver antenna into DC power. The rectifier uses current rectifying electronic components such as diodes with low threshold voltage or electronic circuitry such as transistors that switch synchronously to the received AC.

The rectifier should dissipate as small an amount of power as possible. Therefore, appropriate antenna matching configuration, and load impedance adaptation may be used, especially if simple diode rectifiers are used.

Synchronous rectification may be more complex but provides the potential of low power dissipation, particularly at low rectifier input voltages, the low impedance case.

The load includes the target load that consumes the transferred energy (e.g. battery of a device, device circuitry)

load imposed by the energy receivers own supply (control functions)

load impedance adaptation and load power control, e.g., using a DC/DC converter, ideally with minimum power losses. Depending on the load characteristics, this can act as a step-down or a step-up converter.

The control system 260 of the receiver carries out:

antenna tuning control power and efficiency control

Frequency generation, e.g. if the load requires other than the 60 Hz power frequency, and other housekeeping functions such as system calibration.

In many applications, the receiver's position and orientation (coupling factor) may change. There may be advantages in having the receiver automatically adapt to the different conditions in order to control and maintain power into the load at a desired level and to maximize receiver efficiency.

In a single receiver system, the receiver may adapt independently from the transmitter, e.g., using a model as described above, that determines model parameters using specific measurements (e.g. antenna current and voltage, input power, etc.) and calibration routines. Based on this local model, the receiver's parameters may be optimized to maximize transfer efficiency and to satisfy the power demand of the receiver. If there are multiple receivers, then the model technique above can be used, or the energy receiver and/or transmitter can could feed back data to the other.

Moreover, the system may carry out radiation exposure control e.g. by reducing its power when persons are approaching the parasitic antenna. As in the transmitter case, the wireless interface 270 may be omitted, or can be used for device detection, identification, authentication, or communications/signalling between power transmitter and power receiver.

Detection, identification and authentication of an energy receiving device may be used like current RFID systems, using any of the current RFID standards. Any of the techniques described for the transmitter may be used, including using the power carrier as the communication carrier, or using wireless standards such as Bluetooth, Zigbee, etc. operating in other ISM-bands.

Figure 3:
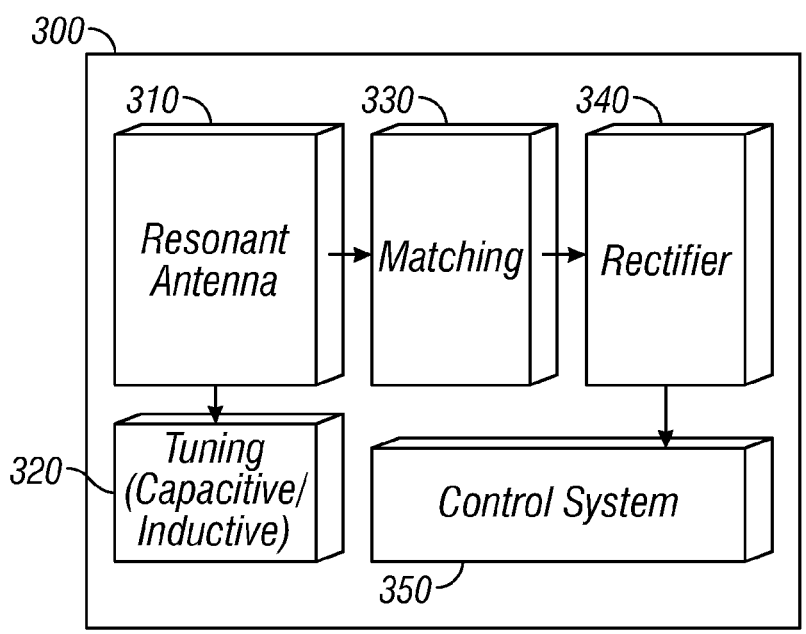
FIG. 3 shows a generic energy relay, parasitic antenna and repeaters.

FIG. 3 illustrates an energy relay system, that uses a parasitic antenna to repeat wireless power in an area.

The generic wireless energy relay uses a resonant parasitic antenna 310 that is resonant with the frequency being repeated. A tuning circuit 320 can be formed of a capacitor and inductor. The system uses matching 330, a rectifier 340, and optionally a load. A control system 350 controls the operation. This energy relay may be used to extend coverage/range of a wireless energy transfer system. It receives energy from an energy transmitter and relays it to an energy receiver. The energy relay may be also considered as a parasitic antenna that locally amplifies the field strength.

In a magnetically/inductively coupled system, the antenna 310 is generally a multi-turn loop (coil) in series with a capacitor. At higher frequencies (HF) single turn loops may be used. The antenna coil must be able to withstand the high voltages and currents resulting when the energy relay subsystem is unloaded (no receivers within range) and/or when the relay is close to the energy transmitter. It must provide a Q-factor as high as possible since this Q-factor will limit transfer efficiency at the fringe of the extended service coverage and range.

Q-factors up to 300 are achievable at LF and up to 600 in the HF frequency range (13.6 MHz). In non-integrated laboratory samples, the Q-factors may be doubled. The materials and components needed to build a parasitic antenna may be the same or similar to those used in an energy transmitter. The parasitic antenna 310 may be tuned in a similar way to those discussed above.

In a similar way, the matching 330 may use the techniques described above.

Rectifier 340 is used to extract DC power that is locally consumed, e.g., by the control system and other circuits. This may use similar structure to that described above. The control system 350 can be used for antenna tuning control and/or for power and efficiency control. In some applications the relay's position and orientation (coupling factor) may change. This may indicate that the relay should automatically adapt to the different conditions.

In an embodiment, the relay may adapt independently from the energy transmitter, using any of the techniques described above.

Figure 4:
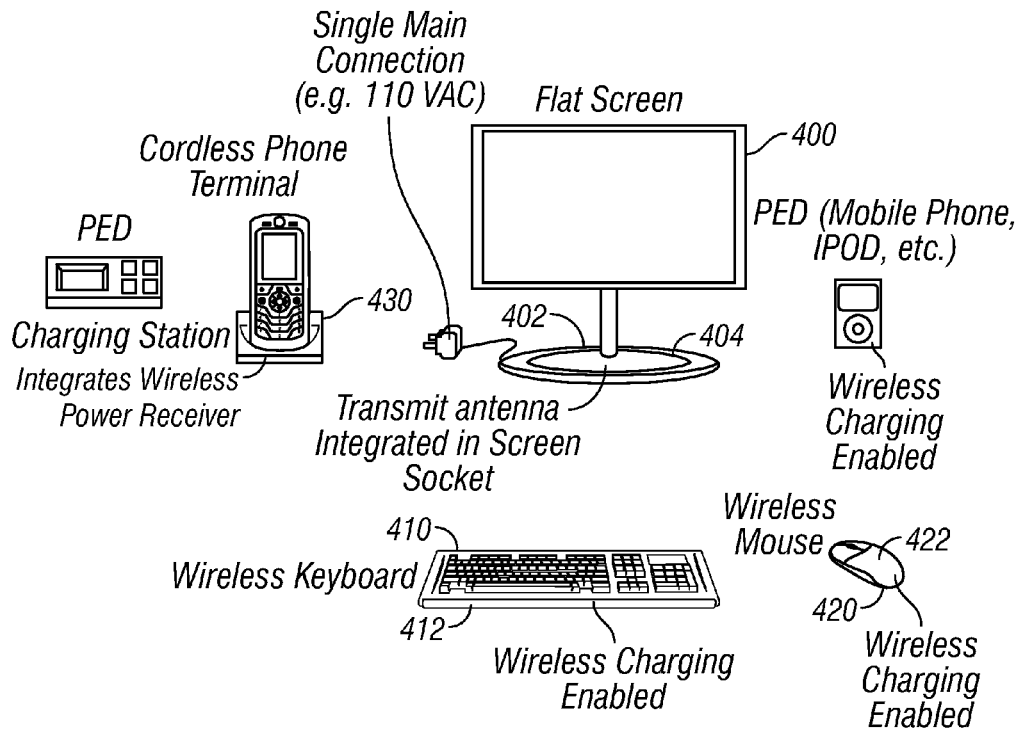
FIG. 4 shows a wireless desktop for a computer.

A wireless interface may also be used, as described above, to detect, identify, and authenticate an energy relay, to activate and deactivate an energy relay and/or to transmit information about the operational status of an energy relay The wireless power system can be used to provide an entirely wireless desktop IT environment as shown in FIG. 4. Handheld communications terminals and IT peripheral devices are powered or recharged from a central power source via a wireless energy transfer. A preferred technique for wireless energy transfer is based on coupled magnetic resonance using magnetic field antennas, e.g., a loop or coil operating either in the LF or HF frequency range.

FIG. 4 shows the wireless desktop embodiment using a personal computer with a screen 400. The screen 400 has a base 402 with an antenna 404 embedded therein. The base may be disk-shaped and may embed a circular wire loop antenna to generate a substantially vertically polarized magnetic field.

Wireless power enabled devices can be placed on a desktop and may receive power from the power transmitter unit. The power transmitter unit as well as the display 400 is operated from AC power, e.g., 110 VAC. This can be used to power desktop devices such as keyboard 410, with its internal antenna 412, mouse 420 with antenna 422, and other personal electronic devices such as mobile phones, music players, PDAs, etc. The placement of these items on the desktop creates a preferentially coplanar orientation of their internal antennas e.g. 412, 422 to the transmit loop antenna 404.

For other devices such as cordless phones, digicams, etc. that are usually placed on a recharging station, the wireless power receiver and its antenna may be integral parts of the recharging station such as 430.

Figure 5:
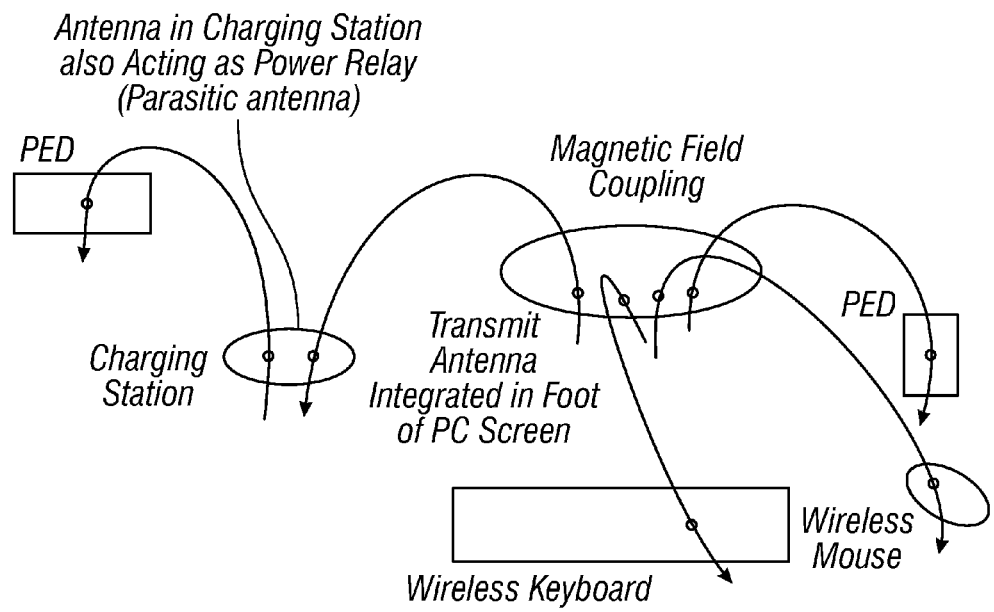
FIG. 5 shows coplanar magnetic field coupling between the desktop devices.

Power receiving devices providing enough space to integrate more effective antennas may also serve as power relays for other low power devices placed close to those devices, as shown in FIG. 5.

Figure 6:
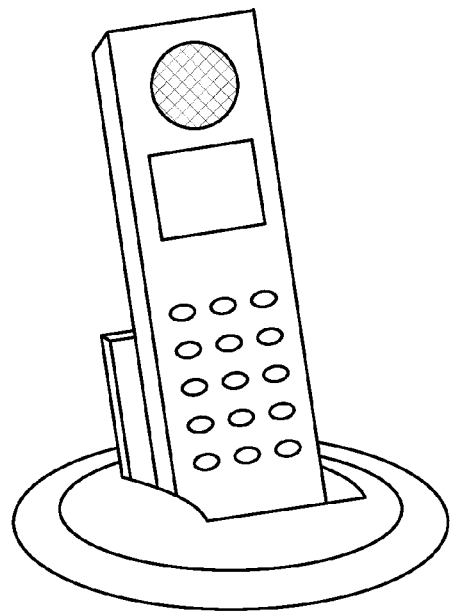
FIG. 6 shows a wireless device in a wireless charging station.
Figure 7:
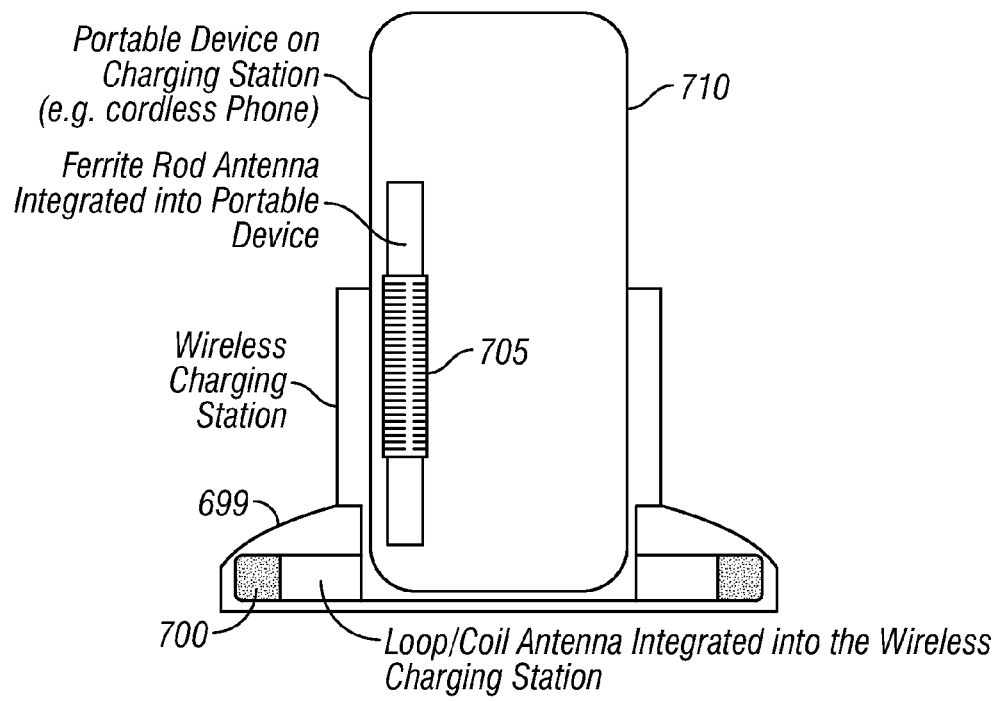
FIG. 7 shows a first embodiment of a wireless charging station.

Other embodiments may be used for variants of a wireless powering or charging station for low power portable electronic devices. An example of a wireless powering or charging station with a portable electronic device (e.g. a cordless phone) is shown in FIGS. 6 and 7. This embodiment may embed a parasitic antenna into a charging base that relays the wireless power to an internal antenna 705 in the portable device 710. In this embodiment, the internal antenna 705 is a ferrite rod antenna. Since the device 710 and its internal antenna 705 is maintained in a specified location relative to the parasitic antenna 700, the relay of power can be tuned to an exact location, and the power transfer can hence be very efficient.

An embodiment uses magnetically coupled resonance to transfer the power from source to receiver. In contrast to ordinary inductive coupling, loosely coupled resonant loop/coil antennas, preferentially of high quality factor, are used for energy transfer. The operating frequency is preferably either in the LF or HF frequency range.

Figure 8:
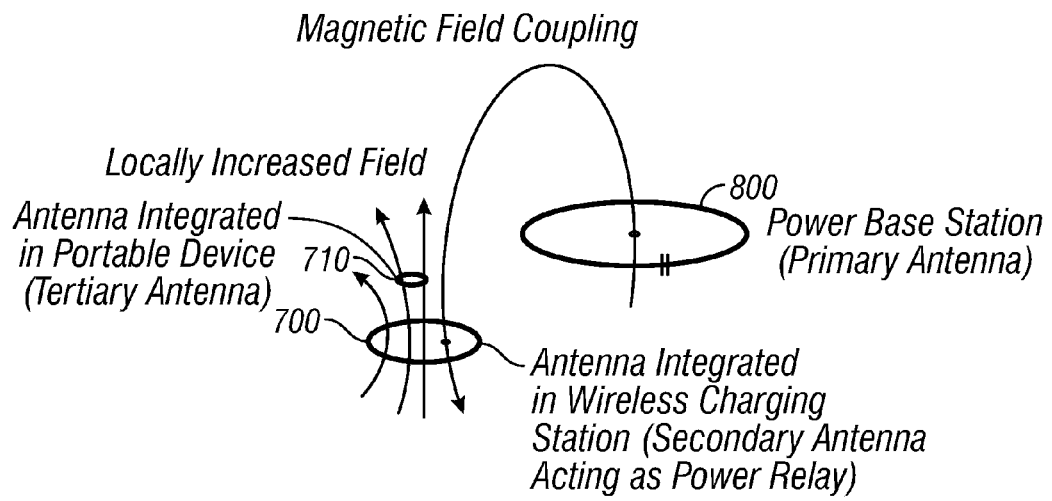
FIG. 8 illustrates the principle of the first embodiment.

In variant 1, depicted in FIG. 7, both the wireless charging station 699 and the portable device 720 integrate a resonant magnetic antenna. The charging station 699 preferably accommodates a loop/coil antenna 700 making efficient use of the space in the socket of the station, while the portable device uses an integrated Ferrite rod antenna or another loop/coil structure with suitable form factor. The wireless charging station antenna 700 is a secondary antenna that receives electrical energy from a power base station primary antenna such as 800. This is then relayed to the antenna 705 of the portable device 710 which is the tertiary antenna 705. This principle is illustrated in FIG. 8.

The portable device 710 may also receive energy directly from the power base station 800. The antenna 705 integrated in the portable device 710 may be less efficient than the antenna 700 integrated in the charging station. As the distance between the primary antenna 800 and the secondary antenna 700 increases, less power can be received directly. The secondary antenna in essence locally magnifies the magnetic field in the vicinity of the charging station increasing the overall efficiency of the receive antenna in the portable device. Therefore, this embodiment can be used to increase the distance of wireless powering and charging; however, when the unit is placed closely enough to the primary antenna, the portable device may also receive electrical energy directly from the power base station, thus not requiring a special charging station. Moreover, the magnetic coupling between charging station and portable device may have special advantages—as discussed above, it can avoid soiling, and oxidation and can be used for multiple different designs of portable devices.

Figure 9:
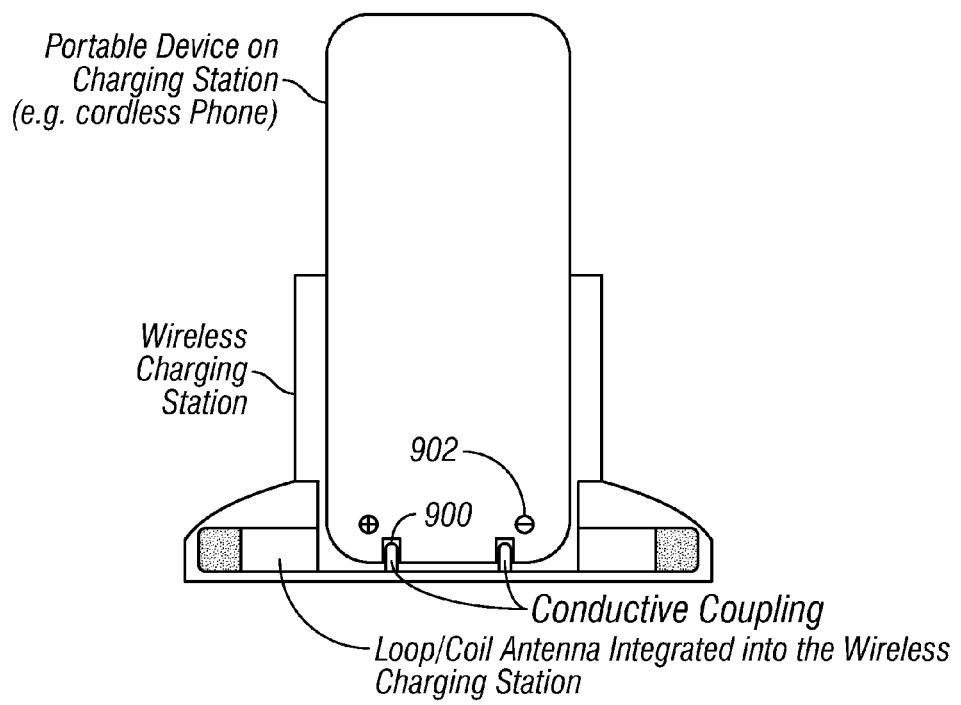
FIG. 9 shows a wireless charging station and portable device according to a second embodiment.

Another embodiment is shown in FIG. 9. In this embodiment, electrical energy received by the wireless charging station is forwarded to the portable device using conductive coupling over contacts 900, 902.

Figure 10:
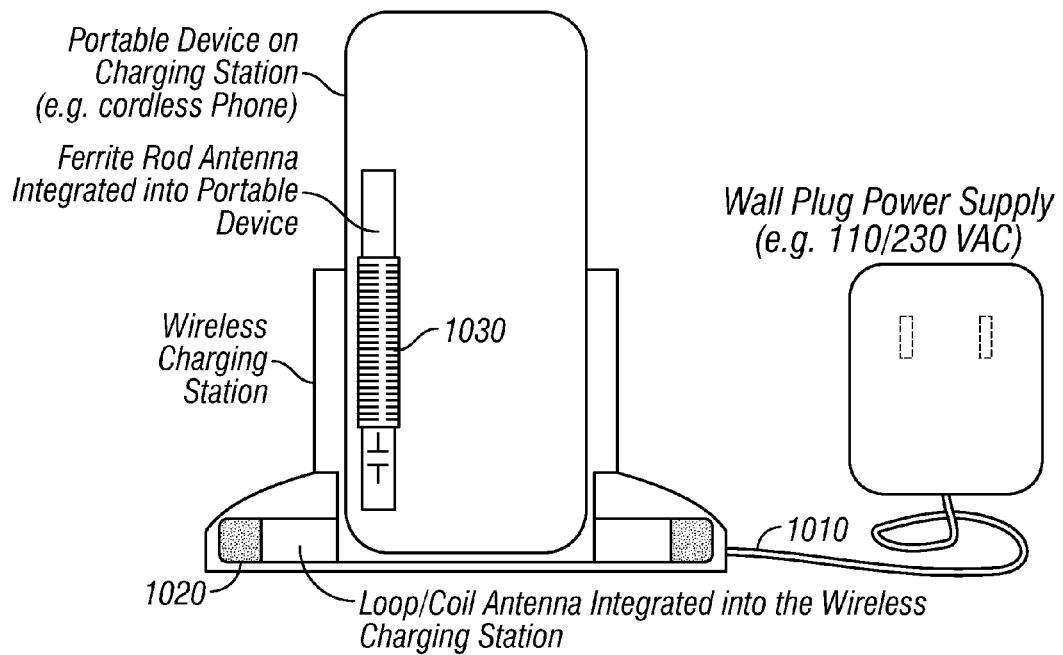
FIG. 10 shows a third embodiment of the wireless charging station.

Another embodiment shown in FIG. 10 receives power through a wired connection e.g. directly from the 110/230 V AC source over wire 1010. However, power is forwarded to the portable device based on magnetic coupled resonance between transmit antenna 1020 and receive antenna 1030.

Another application for wireless power is a wireless power bridge, that recognizes that in certain circumstances, it may be convenient to transmit power through walls or windows.

A first embodiment may use this device to power a laptop PC or other battery operated device with limited autonomy on a terrace or balcony where there is no AC socket. Mounting an AC socket might not be convenient, and the only alternative is an extension cord. In this example, a wireless solution can facilitate transfer of power through walls or windows may be used. The indoor component of this wireless power transfer system can be left permanently installed and the outdoor component is a lightweight accessory or a laptop PC that can be easily carried in a transport bag.

Another embodiment uses this system for powering of sensors mounted to the exterior wall of a house (e.g. burglar alarm system), where it could be otherwise difficult to power those devices.

A Wireless Power Bridge may provide a standard AC socket or a DC power outlet (e.g. 12 VDC). These two variants of a Wireless Power Bridge are sketched in FIG. 11 and FIG. 12, respectively. The transmit subsystem may also produce an invisible local power hot spot that enables easy access to electric power from the other side of a wall using a compatible receiving device.

The Wireless Power Bridge is based on magnetic-field inductive coupling between a resonant transmit antenna and a resonant receive antenna. This uses a non-modulated carrier frequency, of, for example, 50 Hz, that is appropriate for wireless transmission through a wall or window. The preferred frequency is in the range from 20 kHz to 135 kHz (VLF, LF). Another embodiment directly uses the AC power frequency, typically 60 Hz, for wireless energy transfer. One embodiment efficiently transfers power through a non-metallic wall of thickness in the range of a few mm up to 40 centimeters also depending on the size of the antenna. This is accomplished through use of two resonant antennas applying coupled resonance with a high Q-factor (typically >200).

Depending on the dimensioning of the system and the separation of the transmit and receiver antenna (transmission distance) the system may be capable of transferring power up to 100 W, or similar. This can be used to supply e.g. a laptop computer or other devices with similar power consumption.

The system is generally composed of the following components:

Power cord to connect to standard AC socket (e.g. 110 VAC/60 Hz or 220 VAC/50 Hz).

Transmit power converter unit that converts supply AC voltage and frequency (e.g. 110 VAC/60 Hz or 220 VAC/50 Hz) into another voltage and into another frequency (typically >50 Hz) that may be more appropriate for wireless transmission through a wall or window. In one embodiment, the transmit power converter unit uses the standard 60 Hz frequency as the power transmission.

Transmit antenna unit (flat panel) that is resonant on the operating frequency.

Receive antenna unit (flat panel) that integrates a multi-turn loop (coil) and a capacitor to achieve resonance at the desired operating frequency.

A receive power converter unit that integrates an AC/DC or AC/AC frequency converter, which reconverts the frequency used for wireless transmission into the required DC voltage or a standard AC supply voltage and frequency.

Figure 11:
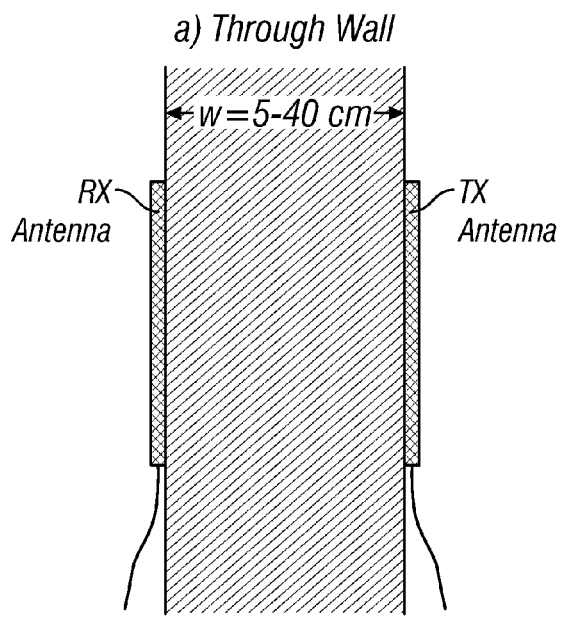
FIGS. 11 and 12 show a wireless power bridge.
Figure 12:
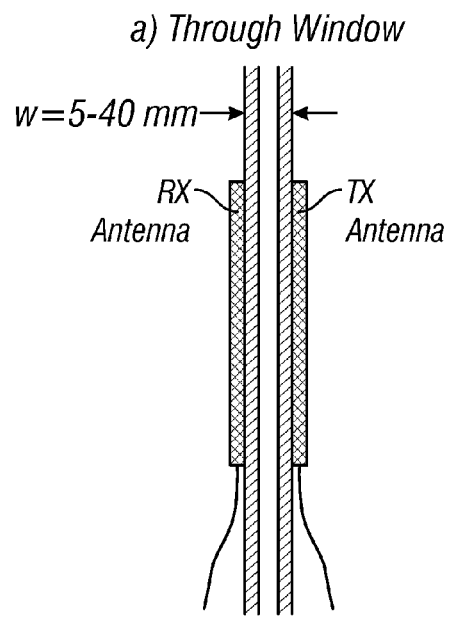

FIG. 11 shows an arrangement to transmit power through a wall and through a window. The distance between the transmit and receive antenna can vary, thus varying the coupling factor. In one embodiment, the system automatically adapts to the actual conditions in order to meet power requirements at receive side and to maximize transfer efficiency.

Moreover, the system may provide automatic antenna tuning to compensate for detuning effects caused by the environment or component tolerances.

The transmit and receive antenna can be coaxially aligned to obtain maximum transfer efficiency. An indicator (e.g. a lower power LED) built into the receive power converter unit may be used, where the LED is brighter as the coupling improves. This technique can be used to find the optimum position of the receive antenna yielding maximum transfer efficiency.

Figure 13:
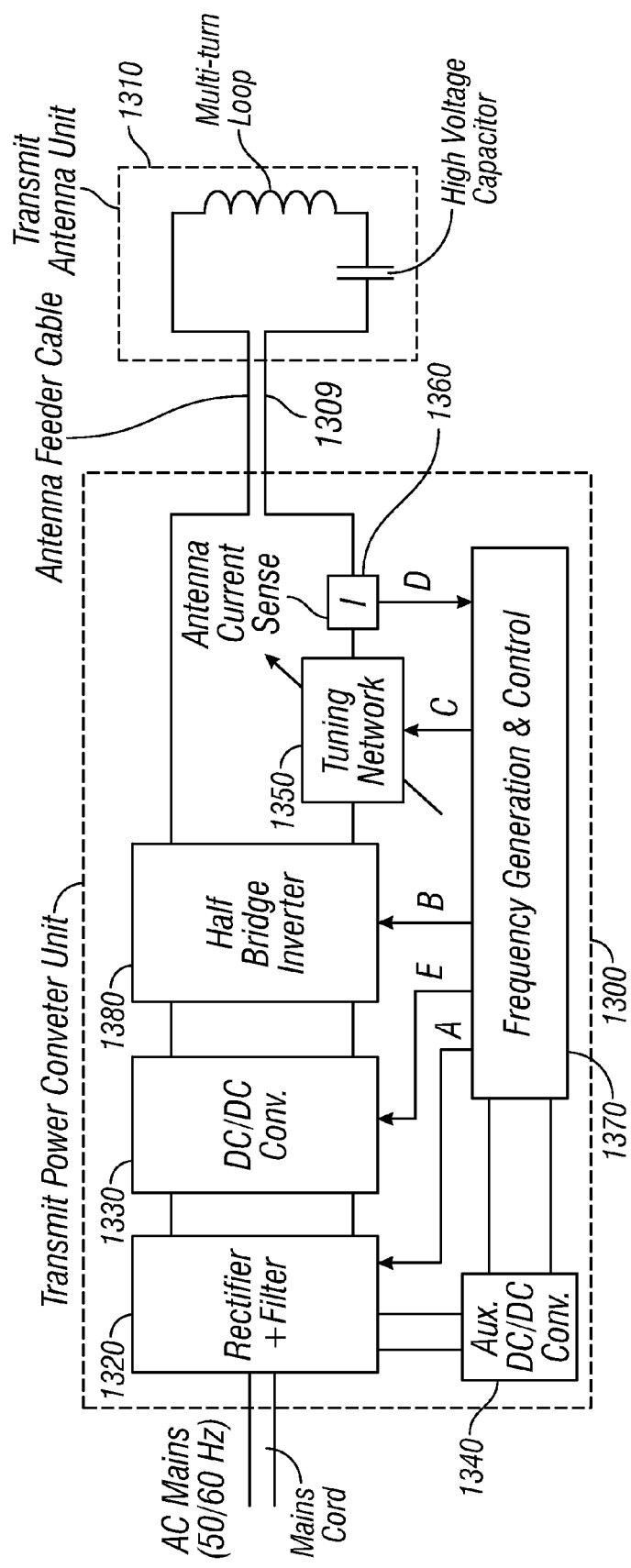
FIGS. 13 and 15 show the transmit and receive subsystem for the wireless power device.

FIG. 13 shows a block diagram of a transmit subsystem that can be used with any of the wireless power embodiments described in this application. The subsystem includes transmit power converter unit 1300, and transmit antenna unit 1310.

The transmit power converter unit 1300 has a number of subunits. A rectifier & filter assembly 1320 generates the raw DC voltage used by the following stages. This can be used by a DC/DC converter 1330 providing the power that is eventually fed to the transmit antenna unit 1310. An auxiliary DC/DC converter 1340 can be used to supply the frequency generation and control subunit with power. A tuning network 1350 can also be powered, in order to maintain precise resonance maximizing antenna current. An antenna current sense 1360 can similarly measure antenna current in terms of magnitude and phase based on power from the converter.

A frequency generation and control subunit 1370 carries out many different functions, including:

generating the frequency used for wireless power transmission, driving the power stage, e.g. the half bridge inverter 1380, automatically controlling functions of the transmit subsystem, as described herein, to control power and efficiency of the Wireless Power Bridge.

control human interface for manual control of the transmit subsystem. this can include, for example, activation/deactivation, power control, etc.

A Wireless Power Bridge can be configured to transfer power up to 100 W and can use a transmit power converter unit with a form factor and outer appearance similar to that of an external power supply used to supply e.g. a laptop computer or other similar power device.

The rectifier & filter subunit 1320 may include functions that are controlled by the frequency generation and control subunit over control interface A. Typically, the DC/DC converter 1330 is a step-down converter providing an output DC voltage that is lower than its input voltage. In general, the output voltage generated by the DC/DC converter 1330 is variable and controlled by the frequency generation and control subunit via control interface B for power control and to achieve maximum energy transfer efficiency.

In one embodiment, this DC/DC converter may be omitted, in which case the power stage (half bridge inverter) is directly supplied by the rectifier and filter subunit. In one embodiment, a switching power supply can be used.

The auxiliary DC/DC converter subunit 1340 provides a fixed DC output voltage to supply the frequency generation and control subunit 1370, as well as the other powered units.

The power stage generating the power carrier used for wireless power transmission is preferably a half bridge inverter 1380 using two electronic power switches, e.g., FETs or transistors, in a 'push-pull' configuration. The power stage is driven and controlled by the frequency generation and control subunit via the control interface B. Power and transfer efficiency control is accomplished through modifying the DC supply voltage of the power stage, and the duty cycle/pulse width of the switching waveform as generated by the frequency generation and control subunit.

In one embodiment where the DC/DC converter provides a fixed DC output voltage, power and transfer efficiency is solely controlled by the duty cycle of the switching waveform.

In another embodiment where the standard AC supply frequency is directly used for wireless power transmission, the power stage is formed of a phase controlled modulator controlled by the frequency generation and control subunit.

The tuning network 1350 can be used to adjust parameters to maintain the antenna operated at resonance. In one embodiment, a fixed and crystal stabilized transmission frequency may be used. This may assist with frequency regulatory issues to reduce the risk of harmful electromagnetic interference to other systems.

This is particularly true for all applications requiring maximum transmission range and efficiency, thus operated with high 'loaded Q-factor'.

The tuning network may also compensate for possible detuning effects caused by the receive subsystem and/or extraneous objects in proximity of the transmit antenna, as well as by the reactive components in the source impedance of the power stage.

The tuning network can also compensate for tolerances (ageing) of components of the transmit antenna unit and its feeder cable.

The tuning network may also be controlled by the frequency generation and control subunit via the control interface C.

Certain embodiments may only require a limited transmission range (e.g. high coupling factor between transmit and receive antenna). In that case, the tuning network may not be needed.

The antenna current sense is used by the frequency generation and control subunit to measure the antenna current in terms of magnitude and phase (sense interface D). The current sense should be done in a way that will not deteriorate the Q-factor of the antenna system. In one embodiment, voltage sensors on receiving devices are used that feed the receive information to the transmitters. An adaptive power transmitter ramps up power in steps and senses the stimulated power levels.

The frequency generation and control subunit generates the frequency and the switching waveforms that to drive a half bridge inverter forming the power stage. The subunit also measures the transmit antenna current using the antenna current sense and adjusts operational parameters of the transmit power converter to satisfy power demand by the receiver (within specified limits). In this way, the power converter can achieve maximum energy transfer efficiency. In one embodiment, the maximum operation may be carried out according to the techniques described in our co-pending application Ser. No. 12/394,033, filed Feb. 26, 2009, the entire contents of the disclosure of which is herewith incorporated by reference.

In one embodiment, the frequency generation and control subunit does not communicate with other entities of the receive subsystem. Both subsystems act independently to determine how to satisfy power demand by the external load connected to the receive subsystem to optimize operating parameters on both the transmit and receive side in a manner to converge at maximum energy transfer efficiency.

The frequency and control subunit 1370 may also include a user interface for activating/deactivating the transmit power converter unit and to manually modify parameters.

The transmit antenna unit 1310 is a purely passive device, fed by the transmit power converter unit via the antenna feeder cable 1309. The cable 1309 can be of length typically 1 m, and may be of a quality and have voltage ratings similar to that of a standard double wire AC cable.

The transmit antenna unit includes a multi-turn loop (coil) and a high voltage capacitor forming a principal part of a series tank circuit. The multi-turn loop is made of well insulated copper wire, set to withstand the antenna voltage that may occur in the worst case. In a typical design, the r.m.s. voltage may be above 1000 V depending on the systems actual power rating and the specified maximum transmission distance.

Assuming an operating frequency in the range between 20 kHz and 135 kHz, preferably an adequately stranded wire such as Litz wire may be used to reduce eddy current losses from skin and proximity effects and to maximize unloaded Q-factor.

In a typical design, the capacitor should be sized to withstand r.m.s. voltages >1000 V depending on the system's actual power rating, the circuit's actual Q factor, and the specified maximum transmission distance.

Figure 14:
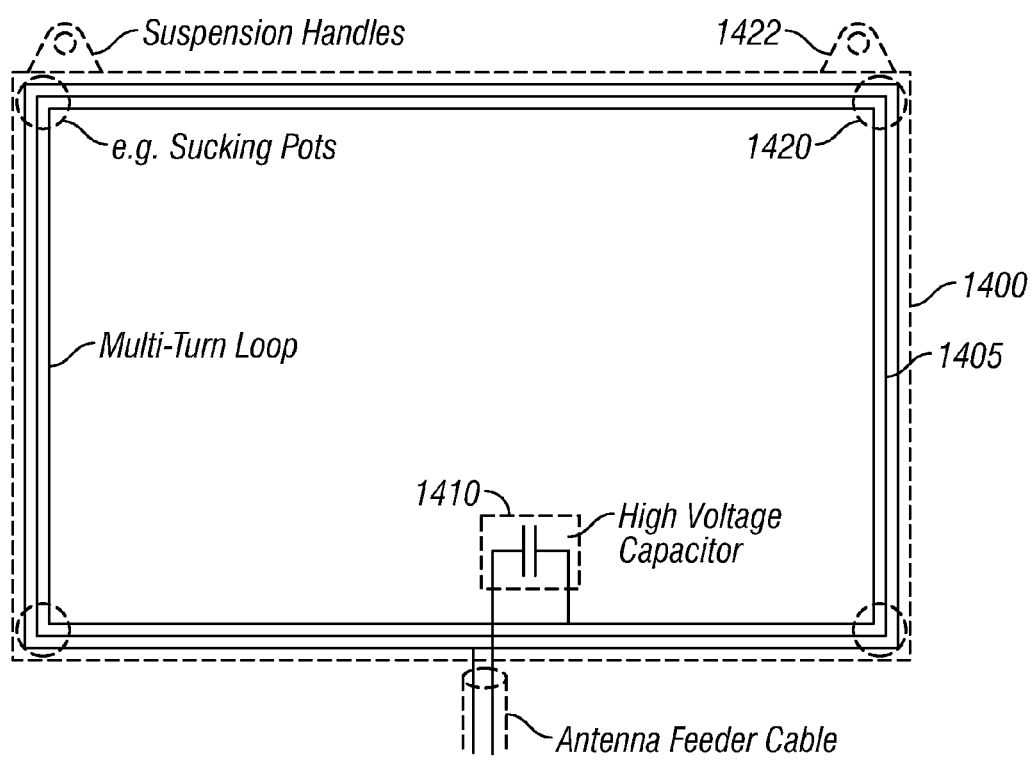
FIG. 14 shows the antenna using used in the wireless power device.

A typical layout of a flat panel transmit antenna unit is shown in FIG. 14. The antenna 1400 is formed of a coil part 1405 and a high voltage capacitor 1410. The high voltage capacitor 1410 is mounted in the interior of the loop to save space and to provide a maximum loop size for a given outer contour form factor. Since the HV capacitor is integrated into the antenna unit, high voltages resulting from resonance with a high Q-factor (high loaded Q) are kept in its interior and do not appear either on the feeder cable nor in the transmit power converter unit. This thus simplifies design and relaxing certain requirements.

The transmit antenna unit 100 may provide special fixtures that simplify permanent mounting or temporarily suspending of the flat panel antenna to walls or windows. FIG. 14 shows suction cups 1420 and suspending handles 1422.

Figure 15:
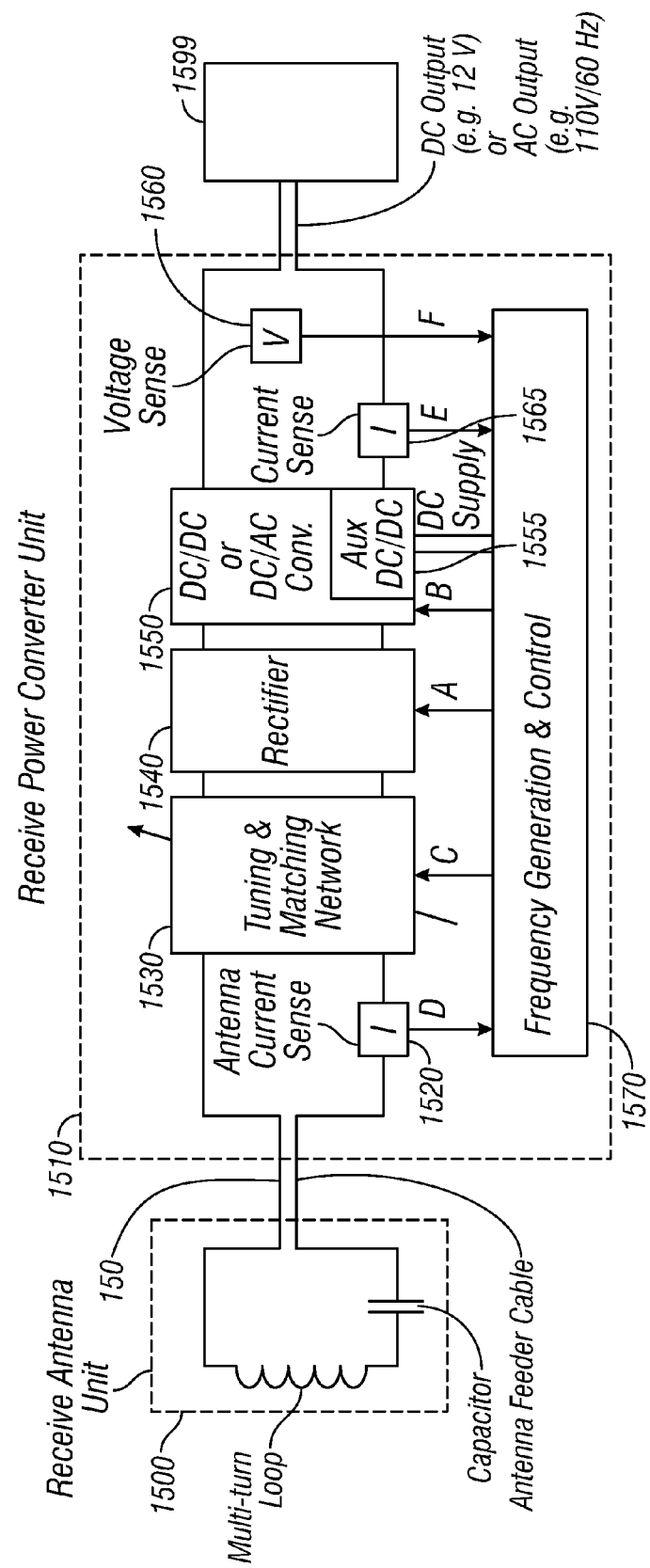

The receive subsystem is shown in FIG. 15. As in the transmit subsystem, the receive subsystem is formed of a receive antenna unit, and a receive power converter unit 1510. Many of these units are very similar to those discussed above.

The receive antenna unit 1500 may be identical to the transmit antenna unit 1310. In another embodiment, the dimensioning of the receive antenna may be different with respect to form factor, constitution, and electrical characteristics, in order to fit this device.

The receive antenna unit feeds the receive power converter unit via the antenna feeder cable 1501, similar to the cable 1309.

The receive power converter unit 1510 may include any or all of an antenna current sense 1520, a tuning and matching network 1530 to maintain precise resonance of the receive antenna by maximizing antenna current and to match the rectifier to the receive antenna, a rectifier 1540 generating the raw DC voltage required by the following stages.

A DC/DC or DC/AC converter 1550 may be used to generate a DC or standard AC supply output, respectively, with a voltage and current satisfying the requirements of the external load 1599 connected to the receive subsystem. It may also include an auxiliary DC/DC converter 1555 to supply the frequency generation and control subunit and other power consuming units.

A voltage sense 1560, and current sense 1565 may be used to measure output voltage and output current into the external load 1599.

As in the transmit unit, there is a frequency generation and control subunit 1570 that automatically controls all relevant functions and parameters of the transmit subsystem to control power and efficiency of the Wireless Power Bridge. This may also include, for example, a user interface that controls manual control and modification of settings via human interface. This can include activation/deactivation, power, voltage and current rating, etc.

The unit 1570 can also generate the standard AC supply frequency as specified for the external load.

Assuming a Wireless Power Bridge dimensioned to transfer power up to 100 W, the receive power converter unit might typically have a form factor and outer appearance similar to that of an external power supply used to supply e.g. a laptop computer or other appliances of similar power rating.

The antenna current sense is used by the frequency generation and control subunit to measure the receive antenna current via sense interface D. The current sense preferably should not deteriorate the Q-factor of the antenna system.

The tuning and matching network is generally used to ensure that the receive antenna is operated at resonance and that the rectifier's input impedance is optimally matched to the receive antenna. This is particularly true for all applications requiring maximum transmission range and efficiency.

The tuning and matching network compensates, as above, for possible detuning effects caused by the transmit subsystem and/or extraneous objects in proximity of the receive antenna, and by the rectifier's load impedance. It compensates for tolerances (aging) of components of the receive antenna unit and its feeder cable.

The tuning and matching network is controlled and may also be reconfigured by the frequency generation and control subunit via the control interface C.

One embodiment of the Wireless Power Bridge requires only limited transmission range, such as would be the case for high coupling factor between transmit and receive antenna. In this case, the tuning and matching network may be omitted.

The Rectifier rectifies and filters the AC voltage as induced into the receive antenna providing the raw DC feed to the following stages. The rectifier and filter subunit may include functions that are controlled by the frequency generation and control subunit via control interface A, as above.

The DC/DC or DC/AC converter may be a step-down or step-up converter depending on the application, providing an output voltage and current satisfying the requirements of the external load connected to the receive subsystem. In general, the output voltage or current generated by the DC/DC or DC/AC converter is variable and controlled by the frequency generation and control subunit via control interface B. in one embodiment, this converter may be omitted, and the external load is then fed directly by the rectifier.

In an embodiment where the standard AC mains frequency is directly used for wireless power transmission, the DC/DC or DC/AC converter may be replaced e.g. by a phased controlled modulator controlling output voltage and current into the external load.

The auxiliary DC/DC converter subunit provides a fixed DC output voltage to supply the frequency generation and control subunit.

The frequency generation and control subunit automatically controls all relevant functions and parameters of the receive subsystem to satisfy voltage and current requirements of the external load and to maximize energy transfer efficiency. If needed, it generates the standard AC frequency as required by the external load and feeds this frequency to the DC/AC converter subunit via control interface A.

Additionally, this measures the antenna current by means of the antenna current sense, the DC or AC output voltage and current by means of the voltage and current sense, respectively. These measurements may be used to compute and/or adjust relevant operational parameters and configurations of the receive power converter unit in order to satisfy power demand by the receiver (within specified limits) and to maximize energy transfer efficiency.

The receive subsystems act independently from the transmit subsystem to satisfy requirements by the external load, while optimizing the receive operating parameters to maximize transfer efficiency.

The frequency and control subunit may also provide a human interface for activating/deactivating the receive power converter unit and to manually modify parameters or configurations.

Efficient wireless energy transfer based on magnetic coupled resonance may be more efficient when using resonant antenna circuits with highest possible quality factor in both energy transmitter and energy receiver.

High Q-factor in conjunction with energy transfer in the order of several watts means high reactive power in the LC tank circuit, since the Q factor can be expressed as:

$$Q = \frac{P_{reactive}}{P_{real}} \quad \text{Equation 5-1}$$

High reactive power means high AC voltages/currents across/through the antenna inductor and its anti-reactor/capacitor.

The antenna can have different designs depending on the application. At LF, the typical solution may be a multi-turn wire loop or coil. A high Q coil can be obtained in one of different ways. One way is to use thin copper wire and a large number of turns for the coil. Another approach may be to use thicker appropriately stranded wire (Litz wire) with a lower number of turns. The Litz wire is formed of individually insulated strands with an optimum diameter for the operating frequency. Another way is to use an appropriate ferrite core and Litz wire with a low number of turns.

The thin/larger number of turns technique may provide a high impedance coil. This means a high reactance and relatively high loss series resistance. This is Q-times lower than the magnitude of the coil's reactance, where Q refers to the Q-factor of the coil that may normally be assumed as the overall Q-factor of the tank circuit.

The Litz wire approach 2 may result in a solution with a lower impedance coil. This means a lower reactance and relatively low loss series resistance, e.g., Q-times lower than the magnitude of the coil's reactance.

The ferrite approach could produce high magnetic field strength (saturation) and resulting low coil Q-factor due to hysteresis losses in the core material.

Assuming equal Q, the thin wire/large number of turns approach may provide a higher voltage at resonance. This in turn provides a higher risk for arcing/discharge particularly with respect to the thinner wire used. Litz wire may provide a solution with higher power transfer capability. On the other hand, if too low impedance is targeted, it may become more difficult to find a capacitor with low enough equivalent series resistance and that can support the high current, particularly under space constraints.

The antenna must also be matched to the power stage. A relatively simple and stabile transmitter solution is obtained by using a low impedance output power stage formed of a voltage source with a half-bridge inverter and a series tank circuit. High efficiency would require this tank circuit to have a series resonance resistance that is higher than the source resistance of the power stage.

For HF (e.g. at 13.6 MHz), similar considerations can be made resulting in similar conclusions. However the number of turns needed will generally be lower at HF, and instead, much thicker wire and larger wire spacing will be required to mitigate skin and proximity effects. Litz wire optimized for frequencies above 1 MHz is not commercially available and probably less useful due to other design constraints.

Another effect often overlooked degrading Q-factor is energy absorption in lossy materials in the antenna's surrounding. The magnetic and electric fields generated by the antenna can cause eddy current losses in non-perfectly conducting materials, magnetic polarization hysteresis losses in magnetic materials and electric polarization losses in dielectric materials At LF, dielectric losses are normally negligible. Q-factor degradation is mainly due to eddy currents and hysteresis losses in conducting and magnetic materials, respectively.

At HF, eddy currents and dielectric losses are mainly responsible for Q-factor degradation.

In many applications of wireless power, the surrounding area of a magnetic antenna is dominated by dielectric materials. In such an environment, low impedance antennas that generate higher currents (magnetic fields) but lower voltages (electric fields) generally perform better.

This aspect of Q degradation is of particular importance, if an antenna must be integrated into a device (e.g. into a foot of a PC screen).

Summarizing, the following aspects may be considered when designing a high Q transmit antenna:

To obtain maximum inductance at lowest resistance (highest Q-factor) the winding should be as dense as possible, meaning that the cross sectional area of the winding must be as low as possible. This is however contradictory to skin and proximity effects and volume needed for wire insulation that must sustain the high resulting voltages, and for power dissipation, e.g., for copper losses.

Above considerations show that practical designs require thorough analysis, complicated tradeoffs and optimizations taking into account all design constraints affecting efficiency of a transmit antenna (volume, form factor, cost, power rating, characteristics and availability of passive and active electronic components, as well as integration aspects).

In most wireless power applications, the size of the energy receivers are constrained to small devices. Furthermore, extra cost needed for enabling wireless power in an electronic device ideally should not significantly increase overall manufacturing costs. The power to be handled in a receiver of a small device will typically not exceed 1-2 watts.

At LF, a loop shaped coil either made of very thin well insulated wire or appropriate Litz wire may be used. However, the effective loop area predominantly affects the performance of the energy receiver. Therefore an effective loop area as large as possible should be obtained. The multi-turn loop ideally should fully encompass the perimeter of the device.

Severe Q-degradation due to eddy current losses in all conducting parts of the device might be expected, however, since the entire electronics is in the interior of the loop, where the magnetic field is highest. Many reasons exist to avoid a metallic housing for this system. The high magnetic field strength may also require special measures to avoid interference into the electronics.

Loop antennas that can be folded out would be preferable in some embodiments. However, the increased mechanical complexity and manufacturing costs of a device may limit its application.

Ferrite antennas and other magnetically permeable materials may be particularly interesting, since they artificially increase the effective area of the coil and additionally concentrate the magnetic field lines into the Ferrite core. Q-factors up to 100 may be achieved with appropriate Ferrite materials at 135 kHz and for a power of 1 W. However, to achieve an effective area comparable to wire structures encompassing the device largest perimeter, Ferrite rod antennas must be relatively long thus becoming bulky and also heavy.

Combinations of the above approaches may also be used. For example, an antenna can use a flat disk-shaped multi-turn loop on a Ferrite backing. This Ferrite substrate might be a few mm thick. Ferrite backing, however, may compromise the effective area of the antenna.

Efficient wireless energy transfer based on magnetic coupled resonance uses resonant antenna circuits with high quality factor in both energy transmitter and energy receiver.

High Q-factor means low bandwidth thus little tolerance for variations of L and C values due to manufacturing tolerances, aging, environmental effects (temperature, extraneous objects interacting with the magnetic or electric field surrounding the LC circuit, non-linear and memory effects, e.g. in conjunction with the use of permeable magnetic materials.

Therefore in practical high-Q designs readjusting tuning of the resonance frequency may help keep a high Q. A resonant antenna system that is automatically tuneable can use tuneable capacitor(s) and/or tuneable inductances, e.g., electrically tuneable reactors. Both must be capable of withstand either high voltages or high currents and made of materials that do not impair the antenna's Q-factor.

The capacitive tuning can use a set of capacitors, e.g., a capacitor bank, in a series or parallel arrangement with RF switches that may be opened or closed to adjust the effective capacitance. This method is particularly useful at LF where mechanically variable capacitors become more bulky.

Figure 16:
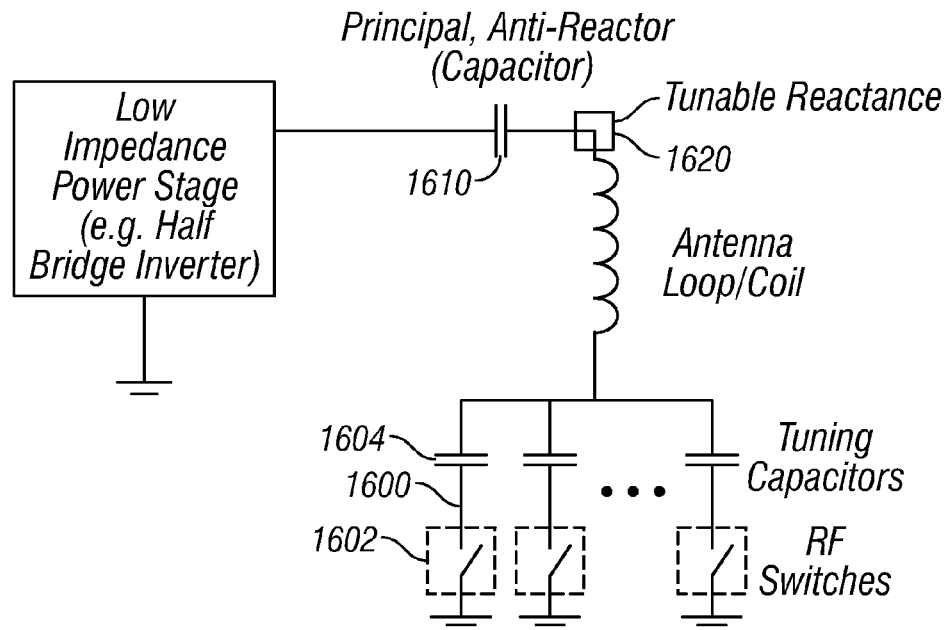

FIG. 16 shows an embodiment of a series resonant transmitter circuit with a tuning capacitor bank 1600 in a parallel arrangement but in series to the principal capacitor 1610. Relays or bipolar semiconductors such as FETs may be used as switching elements 1602 to add or remove the individual capacitors 1604.

Higher Q circuits may require an increasing number of tuning capacitors and tuning switches in the capacitor bank to provide a fine tuning capability while maintaining the required tuning range. Further, as the Q of the LC tank circuit increases, the voltage supported by the capacitor bank increases. The tuning capacitors and the tuning switches are preferably rated for higher voltages. Moreover, because the capacitor bank is in series with the antenna circuit, the tuning capacitors and tuning switches must support high currents and relatively high voltages depending on the tuning range.

The capacitor bank tuning may be combined with a continuously tuneable reactance 1620 for fine tuning.

Figure 17:
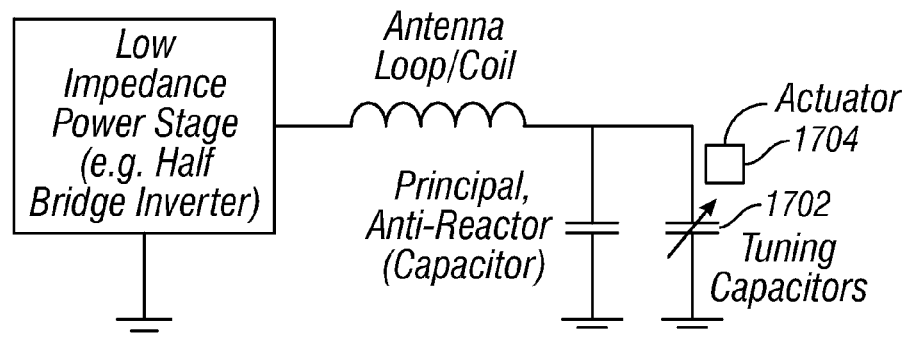

At HF, tuning may be realized with a tuning capacitor of small value in parallel to the principal capacitor as shown in FIG. 17. An embodiment may use a mechanically variable capacitor 1702 driven by a mini-actuator 1704.

Figure 18:
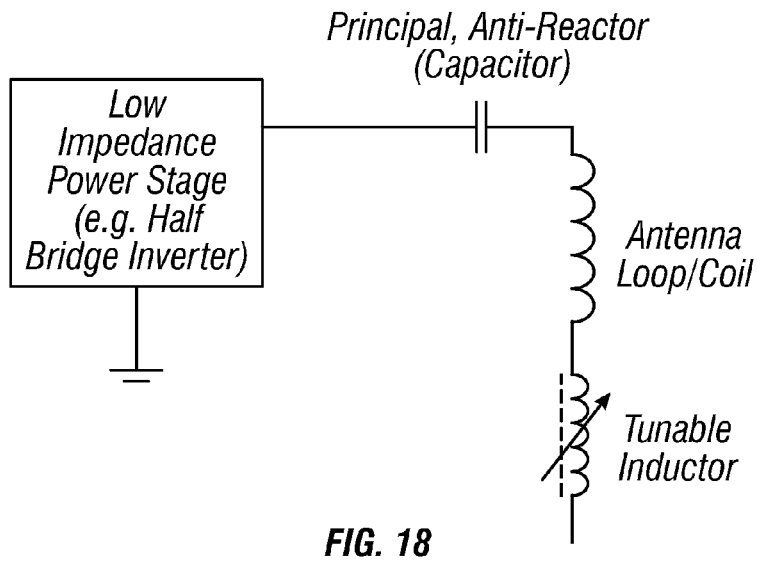

An alternative to capacitance tuning at HF and LF is using a variable inductor as shown in FIG. 18. This may be accomplished by a tapped antenna coil and electromechanical or electronic switches forming a tap selector, a mechanically adjustable ferrite core driven by a mini-actuator, permeability tuning of a ferrite core using a DC bias current Permittivity tuning of a capacitor using a DC bias voltage, which may be considered as the physical dualism to permeability tuning, may also be an option for both HF and LF.

Another approach to fine tuning is to introduce a second loop/coil and altering the coupling factor to the main loop/coil by changing its shape or orientation using the variometer principle.

Figure 19A:
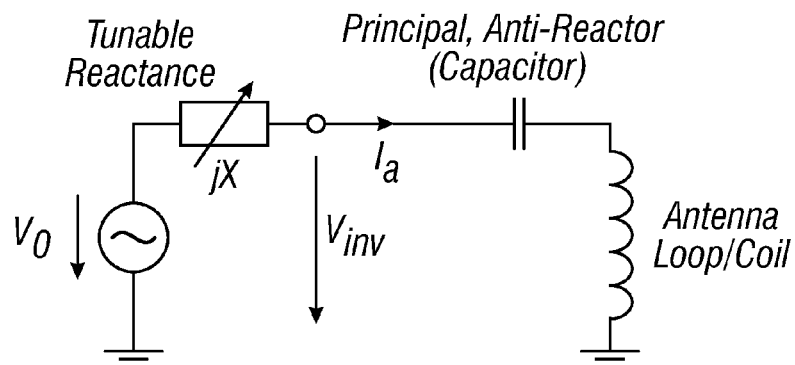
Figure 19B:
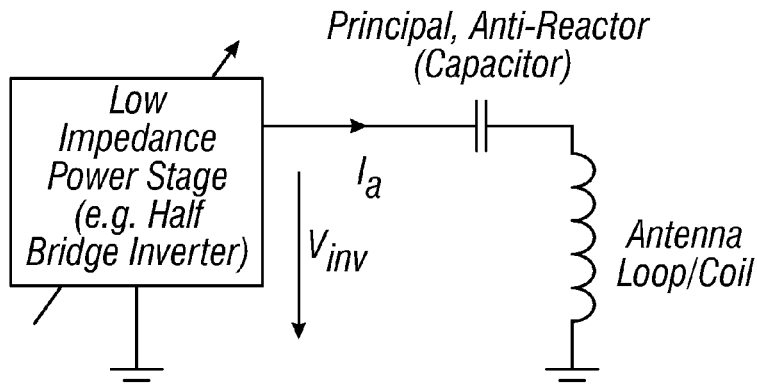
Figure 23:
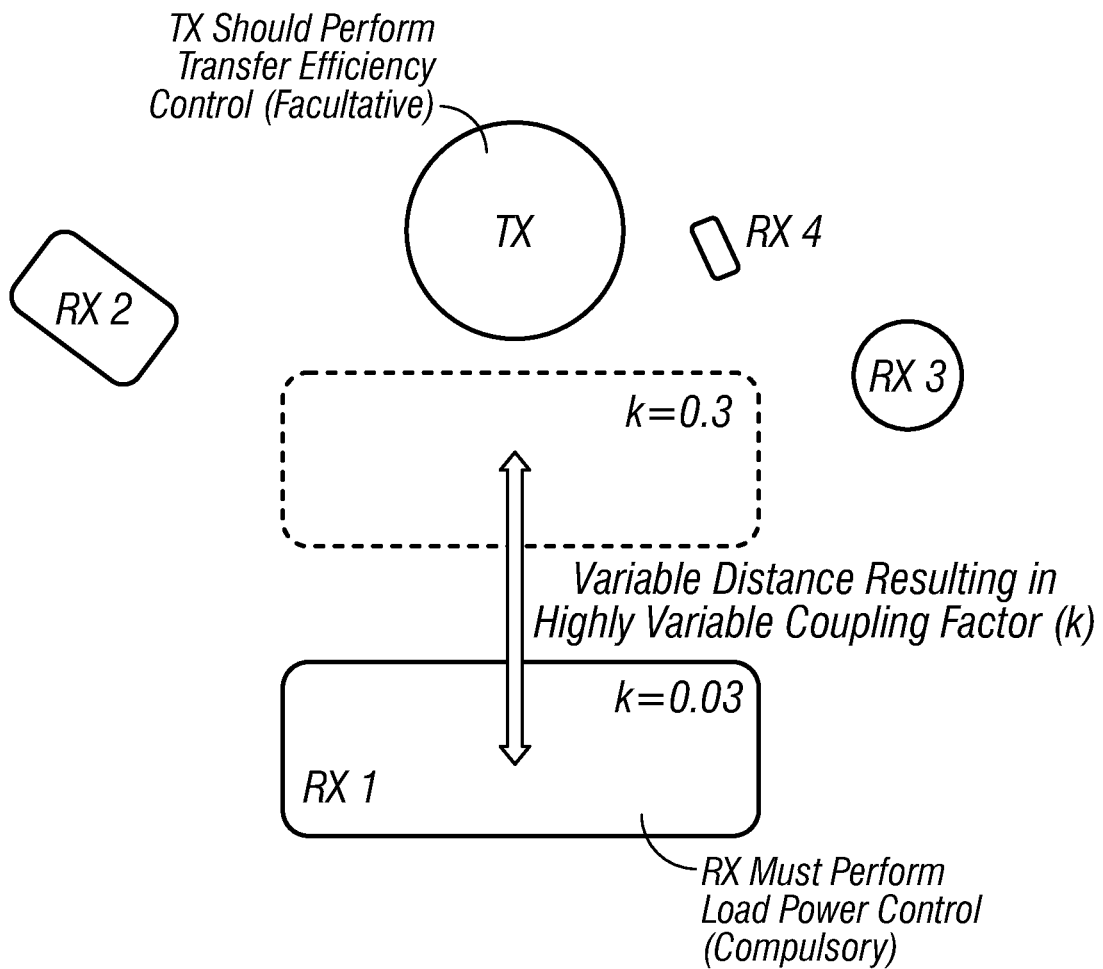
FIG. 23 shows a multiple receiver scenario.

FIG. 19 illustrates a further method that may be considered for fine tuning e.g. in conjunction with a capacitor bank for coarse tuning. This purely electronic method avoids any tuneable reactance components. Instead, it compensates for the antenna current drop in off-resonance conditions by increasing the output voltage of the power stage (e.g. half bridge inverter).

The power stage may be considered as emulating the voltage resulting at the output of a constant voltage source with a tuneable source reactance.

Relatively high output voltages may be required in order to provide a useful tuning range, thus setting more stringent requirements to the electronic switching elements of the power stage if efficiency is to be preserved.

The fine tuning control loop senses the antenna current and controls the output voltage such that the desired antenna current results.

The general principles, methods, considerations, and conclusions described relative to the transmit antennas also apply to the tuning problem of a receive antenna. In receiver applications, however, space and cost constraints are typically much more stringent than in transmitters, particularly regarding integration into small portable devices. On the other hand, relaxed requirements with respect to antenna voltages and currents can be expected since small receive antennas will typically be rated for lower power, and provide lower Q-factor than transmit antennas.

Capacitor bank tuning as typically used at LF may be less favorable with respect to space constraints.

At HF, tuning may be realized with a tuneable capacitor of small capacitance in parallel to the principal capacitor as in FIG. 17. Its realization may be a mechanically variable capacitor driven by a mini-actuator.

A permittivity tuneable capacitor using a DC bias voltage may be used for LF and HF.

An embodiment may use a variable inductor of the type shown in FIG. 20. This may be use a tapped antenna coil 2000 with capacitor 2010. Electromechanical or electronic switches form a tap selector 2030 for coarse tuning. A mechanically adjustable ferrite core 2040 is driven by a mini-actuator 2050.

Another embodiment may use permeability tuning of a ferrite core using a DC bias current for fine tuning.

Another embodiment shown in FIGS. 21A and 21B may alter the inductance of the antenna using a mechanically movable coil 2100 that slides to different positions, driven by a mini-actuator 2105. The position of the coil over the ferrite sets its inductance.

Mechanical tuning of a ferrite rod antenna has the advantage of not requiring any additional components in the tank circuit thus maintaining the Q-factor.

FIG. 22 illustrates a further method that may be used for fine tuning a receive antenna e.g. in conjunction with a capacitor bank for coarse tuning. This purely electronic method avoids any tuneable reactance components. A switched-mode power conversion shown as 2200 creates an antenna load impedance that can be varied in terms of both resistive (real) part and its reactive (imaginary) part. The reactive part adds reactance into the series tank circuit, thus changing its resonance frequency.

In the embodiments, a signal can be formed that is indicative of a need for tuning, e.g., a signal indicative of mismatch, or power degradation, or inductance, or the like. This signal can be used to adjust the variable capacitor or the variable inductor, or both.

Integration of receive antennas into small electronic devices is a particular design challenge as there may be limited space available for additional components. Also, the, small form factor limits antenna area, and hence limits the antenna performance. There are also dielectric and eddy current losses in PCBs and other components containing lossy dielectric and metallic structure lowering antenna Q-factor. There is also a potential of electromagnetic interference to certain device functions.

Ideally, a high Q resonant loop/coil antenna should be separated from the device main body, e.g. in a part that can be folded out for the purpose of wireless charging. A device/keyboard cover that can be folded out and that integrates the wireless power antenna as shown in FIG. 22A may be used in a clamshell style phone.

Another embodiment integrates the antenna into a part, causing lower losses and providing better penetration of magnetic fields because it contains less metallic and/or dielectric structure, e.g. in the keyboard part of a mobile phone (see FIG. 22B. This may be considered as the "compact" configuration.

At LF eddy currents induced into metallic structures may be the predominant loss contributor. At HF, both eddy currents and dielectric losses may degrade the Q-factor.

At LF, ferrite rod antennas are particularly interesting with respect to their integration in small compact devices. Ferrite cores tend to concentrate the magnetic field into the core reducing magnetic field strength in the surrounding thus lowering eddy current losses in the device.

FIGS. 22C and 22D show ferrite cores integrated into clamshell and compact devices respectively. A ferrite rod antenna uses a magnetic field perpendicular to that of an air coil aiming at maximum induction. Thus orientation either of transmit antenna or device should be changed relative to a system using a device with an integrated air loop receive antenna.

Wireless energy transfer based on magnetic coupled resonance generally involves a number of power conversion stages in both transmitting and receiving subsystem. This can be seen e.g. from the block diagrams of the Wireless Power Bridge as shown in FIGS. 13 and 15. In order to achieve high end-to-end transfer efficiency, each stage should be optimized, to prevent losses from accumulating across the chain. On the transmit side, particular emphasis could be placed on the power stage driving the transmit antenna. Typically, a half bridge inverter in conjunction with a series antenna tank circuit is used for wireless power transmission at LF. This is particularly advantageous since this circuit results in a maximum output current at resonance and a current drop in off resonance conditions and generally low harmonic levels.

High efficiency will be obtained when the real part of the inverter's source impedance is considerably smaller than the equivalent series loss resistance of the antenna tank circuit. Efficiency is also improved when there is little or no power dissipation in the transmitter's source resistance. All generated energy is either transferred to a receiver or partially dissipated in the transmit antenna's loss resistance.

Power and efficiency control of the transmitter may be performed by either the DC supply voltage of the half bridge inverter or by the duty cycle of the driving waveform, or both.

On the receive side, the rectifier and load adaptation may be important. A rectifier can be built with very low voltage drop and ohmic losses. The rectifier may be inserted directly into the antenna circuit e.g. into a series tank circuit, analogous to the transmitter. Efficiency is again improved when the resistive losses in the rectifier are minimized. Classical rectifiers e.g. Schottky diodes might have too high a loss and hence so-called synchronous rectifiers based on synchronously switched transistors may be preferred.

Load adaptation and current control (in case of wireless battery charging) may be performed with efficient step-down or step-up converters.

In a multiple receiver scenario, adaptivity over a wide range may be useful, so that these receivers can be able to maintain power into load at any coupling factor and in a worst case without assistance of the transmitter.

In a single receiver scenario where the distance between transmit and receive antenna may vary over a wide range. Therefore, power transfer into the load at the receive end may be controlled. This will be true in many wireless powering and charging applications.

Overall system efficiency is a wholly separate issue from received power. A system that performs both power and efficiency control will have the goal of converging to a state where overall transmission efficiency is at a maximum. In this state, receive antenna will be differently loaded than in a system performing receive power control only.

Receive power can be controlled by adapting the antenna's load impedance. The load adaptation may use a circuit that is highly adaptive, meaning that the receiver must be capable of varying the antenna loading over a wide range. It can also be theoretically shown that in a system based on coupled resonance, there is no requirement to readjust antenna frequency tuning when the coupling factor between antennas is changing, provided that each antenna is correctly tuned to the operating frequency, independent of its loading. Thus, the problem of adapting the system to different coupling factors reduces to load adaptation.

The multiple receiver scenario is more complex since in general there exist different receivers in different coupling conditions also having different power demand. An example of a multiple receiver scenario that may result e.g. in the wireless desktop IT application described in previous embodiments is shown in FIG. 5-9.

In a multiple receiver scenario, power and receive antenna loading control is of greater importance.

One embodiment uses a model compensation technique when there is only one receiver, and uses a feedback sensing technique when there is more than one receiver.

A receiver approaching the transmitter ideally should not negatively affect power transmission to other more distant receivers e.g. by sucking off large amount of power or mismatching the transmitter.

FIG. 5-9 shows how power and transfer efficiency control can be used to compensate the variable coupling factor and to share available power among receivers in an equitable manner and according to their demand. In one embodiment, the devices may be arranged in a coplanar arrangement.

A similar problem may result if two receivers are approaching each other and start to mutually couple. Load control in the receivers can be used to manage these different scenarios, e.g., by adjusting the tuning to avoid detuning effects.

The multiple receiver scenario is much more complicated than the single receiver scenario. In case of a single receiver, efficiency control is straightforward. A multiple receiver scenario transfer efficiency control is much more complex and may also use data exchange (communication) between transmitter and receivers to optimally adjust system parameters. Efficiency control will also be less effective, as the system may need to consider the link with lowest coupling factor, thus not being able to improve efficiency in the more favorable links. In other words: a single distant receiver can degrade the overall transfer efficiency in a multiple receiver scenario.

Licensing issues may also be considered. The use of frequencies for wireless transmission with a power above a certain uncritical level normally requires a license and a specific assignment of that frequency for this purpose/service.

Frequencies in the so-called ISM bands are exempted from such regulation. There exist a number of ISM bands in frequency ranges that could principally be used for wireless power applications.

For vicinity coupling systems designed to operate over distances say up to 1 m, frequencies in the VLF, LF, or HF spectrum are of particular interest. Presently there are however only a few ISM bands permitting license-exempt operation at increased magnetic field strength levels.

Some of these bands are allocated below 135 kHz (VLF, LF). Another narrow band exists in the HF spectrum at 13.56 MHz (+/−3 kHz).

The regulatory norm applicable in these frequency bands defines emission limits e.g. in terms of magnetic field strength measured at a specified distance from the radiation source. The distance specified by ECC for Europe differs from that specified by FCC for US, thus field strength limits cannot easily be compared. At the first glance it looks like that LF allows for higher emission levels thus being advantageous over HF. However, the magnetic field strength resulting at LF is higher than that at HF assuming equivalent systems transferring equal power with equal efficiency over the same distance. In theory the field strength resulting at 135 kHz (LF) is 20 dB higher compared to 13.56 MHz (HF). Present regulations take this fact partially into account. Limits at LF are comparatively more restrictive than those defined for HF.

Moreover, comparing ECC and FCC emission limits taking into account proposed factors for distance correction make it appear that the FCC is generally more restrictive than ECC, though many products used in Europe are also traded and operated in the US (e.g. high power RFID readers).

Establishing a very narrow frequency band at LF (e.g. +/−100 Hz) permitting license exempt operation at increased levels on a world-wide basis may be used in one embodiment. Such allocation would however require lobbying activity from various stake holder groups of the wireless power and RFID companies, and might require evidence that wireless power systems would not cause harmful interference to relevant radio services. Similar developments already occurred at 13.56 MHz, where emission limits were increased by almost 20 dB based on pressure of the RFID lobby. This change request was accepted by regulatory bodies, since RFID readers transmit a strong continuous wave component requiring very narrow bandwidth.

A primary purpose of frequency regulation is to protect radio services from mutual interference. There exist however a number of non-radio systems with limited immunity to electromagnetic radiation such as wire bounded communication systems (mainly those using non-properly shielded lines such as powerline, ADSL, VDSL, etc.)

safety critical systems such as cardiac pacemakers security critical systems such as credit cards, etc.

These systems are not specifically protected by frequency regulatory norms. However, embodiments of the wireless power systems produce essentially non-modulated radiation fields, forming a major advantage in regard to these EMC aspects. The interference potential from modulated or pulsed emissions such as produced by high power RFID, induction cooking, etc. is known to be much higher in general.

Beside frequency regulatory norms regulating coexistence of radio systems, radiation exposure limits have additionally been established to protect biological being from adverse biological effects. The biologic limits are set based on thresholds above which adverse health effects may occur. They usually also include a safety margin. In the frequency range of interest for wireless power applications, radiation is termed nonionizing radiation (NIR). One relevant association concerned with non-ionizing radiation protection is INIRC that was established in 1992. Their function is to investigate the hazards, which are associated with different forms of NIR, to develop international guidelines on NIR exposure limits and to deal with all aspects of NIR protection. The ICNIRP is a body of independent scientific experts consisting of a main Commission of 14 members, 4 Scientific Standing Committees and a number of consulting experts. They also work closely together with the WHO in developing human exposure limits.

The ICNIRP have produced guidelines for limiting electromagnetic field exposure in order to provide protection against known adverse health effects [ICN 98]. Various scientific studies have been performed worldwide. Results of these studies were used to determine thresholds at which the various adverse health effects could occur. The basic restrictions are then determined from these thresholds including varying safety factors. Basic restrictions and reference levels have been provided by INIRC for both:

General public exposure: exposure for the general population whose age and health status may differ from those of workers. Also, the public is, in general, not aware of their exposure to fields and cannot take any precautionary actions (more restrictive levels), and Occupational exposure: exposure to known fields allowing precautionary measures to be taken if required (less restrictive levels)

The coupling mechanisms through which time-varying fields interact with living matter may be divided into three categories:

coupling to low-frequency electric fields results in reorientation of the electric dipoles present in the tissue coupling to low-frequency magnetic fields results in induced electric fields and circulating electric currents absorption of energy from electromagnetic fields results in temperature increase which can be divided into four subcategories:

100 Hz-20 MHz: energy absorption is most significant in the neck and legs

20 MHz-300 MHz: high absorption in the whole body

300 MHz-10 GHz: significant local non-uniform absorption

>10 GHz: energy absorption occurs mainly at the body surface

The following is a description of the scientific bases that were used by INIRC in determining the basic restrictions for different frequency ranges:

1 Hz-100 kHz: restrictions are based on current density to prevent effects on nervous system function 100 kHz-10 MHz: restrictions are based on the Specific Energy Absorption Rate (SAR) to prevent whole-body heat stress and excessive localized tissue heating as well as current density to prevent effects on nervous system function 10 MHz-10 GHz: restrictions are based solely on SAR to prevent whole-body heat stress and excessive localized tissue heating The basic restrictions are based on acute, instantaneous effects in the central nervous system and therefore the restrictions apply to both short term and long term exposure.

A summary of the biological effects for each frequency range is shown below:

Frequencies below 100 kHz:

Exposure to low frequency fields are associated with membrane stimulation and related effects on the central nervous system leading to nerve and muscle stimulation.

There is little evidence that magnetic fields have a tumor-promoting effect and the data is insufficient to conclude whether these fields promote the growth of currently present cancerous cells.

Laboratory studies have shown that there is no established adverse health effects when induced current density is at or below 10 mA/m$^2$.

Frequencies above 100 kHz:

Between 100 kHz and 10 MHz, a transition region occurs from membrane effects to heating effects Above 10 MHz the heating effects are dominant Temperature rises of more than 1-2° C. can have adverse health effects such as heat exhaustion and heat stroke A 1° C. body temperature increase can result from approximately 30 minutes exposure to an electromagnetic field producing a whole-body SAR of 4 W/kg.

Pulsed (modulated) radiation tends to produce a higher adverse biological response compared to CW radiation. An example of this is the "microwave hearing" phenomenon where people with normal hearing can perceive pulse-modulated fields with frequencies between 200 MHz-6.5 GHz For health/biological limits, all organizations and regulatory bodies throughout the world agree upon the scientific findings that a whole body SAR of 4 W/kg is the threshold at which adverse health effects can occur. They also agree that for the basic restrictions, a safety factor of 10 should be used, so that the basic restrictions on whole body SAR should not be any higher than 0.4 W/kg for occupational exposure and 0.08 W/kg for general public exposure.

The different standards disagree is in regard to the H-field reference levels for human exposure. The IEEE provides the most non-restrictive limits based on a variety of scientific studies. The IEEE limits are generally accepted in north America (as they are also approved by ANSI) as well as NATO. The most restrictive levels are provided by ICNIRP as a large safety factor is taken into consideration for these limits. Japanese proposed limits are somewhere between the IEEE and ICNIRP limits. There is no evidence showing that the limits proposed by the IEEE C95.1 standard would still provide dangerous exposure levels.

In all cases, the human exposure H-field reference levels can be exceeded, as long as a wholebody SAR of 0.08 W/kg is not exceeded.

In the embodiments for wireless power applications for vicinity coupling, magnetic field strength is generally below IEEE/NATO limits. It may however exceed ICNIRP limits at positions close enough to transmit or receive antennas. As magnetic fields in the near field of an antenna increase with the 3rd power of distance, there is always a radius where ICNIRP limits may be exceeded, also depending on antenna size, performance, and power/currents.

In contrast to frequency regulatory limits, radiation exposure limits do not specify a distance from the radiation source where field strength has to be compliant. They have to be interpreted as applying to all loci where biological matter may be located, which makes definition of compliance fuzzy.

This problem is however not unique to wireless power but is also an issue of other systems such as RFID systems, induction cooking, induction welding, etc. Such systems require judgment and certification by a competent body.

Concluding, radiation exposure is an issue requiring serious investigation not least because of the increasing phobia of electromagnetic radiation among a majority of people, especially in Europe. It is considered a big challenge and a potential risk of vicinity coupling wireless power mainly in mass market applications.

Beyond that is user perception: some people may not like to be continuously exposed to AC magnetic fields e.g. while working at their office desk, independently of their actual strength relative to established limits.

One embodiment discloses transmission activity control. Devices are only charged during time of absence (e.g. during the night) using a human presence detector (e.g. microwave movement or infrared sensor or both, or other methods). During time of presence of a human being in the proximity or vicinity of the transmit antenna, power is switched-off or reduced to lower levels.

The devices may provide receive a power level indicator to ensure that they are kept in a position/orientation such to receive sufficient power from the transmitter. This indicator function may be preserved also during non-active times or in times of reduced power mode.

This may be accomplished through the following alternative methods:

periodic very low duty cycle activation of transmitter using soft power ramp-up or ramp-down in order to avoid EMI problems (e.g. 'clicks' in devices having an audio interface such as phones, speaker systems, etc.)

continuous transmission at reduced power levels but sufficiently high to be detected by the device to control the level indicator Office equipment (personal computers, monitors, fax machines, scanners, copiers, printers, etc.) account for a large proportion of electricity consumption in the tertiary sector. In the context of international commitments, particularly in the area of climate change (notably the Kyoto Protocol), and given its objectives in such areas as sustainable development, the energy efficiency initiatives take on special significance. This coordinated labelling program (known as ENERGY STAR) enables consumers to identify energy-efficient appliances and should therefore result in electricity savings that will help not only to protect the environment but also to ensure the security of the energy supply. The program may also help to encourage the manufacturing and sale of energy-efficient products.

Energy star guidelines have already been implemented and may also affect to a certain degree future market introduction of wireless power products.

In the last years, a number of companies also supported by academia have started research and development activities in the area of wireless power mainly in regard to applications in the consumer market sector. A majority of these initiatives focus on solutions using inductive coupling as the technological basis. Typical solutions are inductive charging pads designed for contactless charging of a single or multiple devices. In all these solutions power is transferred over very short distances e.g., millimeters or centimeters. Using the terminology of the RFID world, these systems/solutions fall into the category of proximity coupling systems.

Similarly to RFID applications, a proximity coupling solution for wireless powering and charging is not always practical and cannot provide the flexibility/mobility and degree of freedom expected by users. This is the rationale behind power transmission over larger distances in the range of decimeters or even meters. Using again RFID terminology, such systems may be associated to the category of vicinity coupling systems.

The price for more range and flexibility/mobility is generally higher radiation levels higher device integration impact in terms of complexity and costs (BOM)

lower transferable power lower transfer efficiency

In Table 6-1 below, proximity coupling and vicinity coupling is compared with respect to selected aspects that are considered relevant.

TABLE 1

|  | Proximity coupling | Vicinity coupling |
| --- | --- | --- |
| Basic solution | Wireless power enabled devices must be positioned on an inductive pad (virtually zero range but contactless) | Wireless power enabled devices can be positioned in proximity or vicinity of a power base (short range) |
| Basic technology | Classical inductive coupling with high coupling factor and low Q resonance | Magnetic coupled resonance (inductive coupling with high Q-resonance to compensate for low coupling factor) |
| Energy efficiency | Higher Close to those of corded solutions possible (60 to 90%) | Lower Depending on position/distance of device (0.5-90%) |
| Radiation exposure/ EMC issues | Lower No particular problems expected for smart charging pads that can automatically detect loads and control power accordingly. Less constraints on transferable power | Higher Tight constraints for transferable power and range by radiation exposure limits Potential of interference of other systems susceptible to strong magnetic fields (not exhaustively tested yet) May require more public convincing May require special means to control field strength in human presence to get market acceptance |

TABLE 2

| Frequency regulatory & standardisation efforts | Lower Can be designed more easily to meet existing regulations & standards Potential to be supported by a broad stakeholder group thus becoming a main stream standard | Higher May require new regulations and standards specific to wireless power May require some lobbying efforts to get approval of frequency authorities May require standardised wireless power interface and frequency to achieve device compatibility Standardisation efforts might be torpedoed by stakeholders of proximity systems |
| --- | --- | --- |
| Implementation costs (BOM impact) | Lower Very simple RX solutions possible Lower Q-factor in base and RX Tuning in RX not compulsory | Higher High Q-factor required leading to higher voltages/ currents (physically larger components needed) Precise tuning in base and RX compulsory Wide-range adaptability in RX required |

TABLE 2-continued

| | | |
|---|---|---|
| Impact on device design | Lower<br>Solutions with very low impact on device size/form factor and internal circuitry possible | Higher<br>Larger/more bulky antennas & likely more complex electronics required<br>More design constraints to preserve high Q-factor |
| Device positioning degree of freedom | Lower<br>No solution e.g. for wireless desktop applications | Higher<br>Attractive solutions e.g. for wireless desktop applications (e.g. for charging keyboard, mouse) |
| Multiple device powering/charging | Limited depending on size of pad and available transmit power | Less limited depending on available transmit power |

TABLE 3

| | | |
|---|---|---|
| Frequency regulatory & standardisation efforts | Lower<br>Can be designed more easily to meet existing regulations & standards<br>Potential to be supported by a broad stakeholder group thus becoming a main stream standard | Higher<br>May require new regulations and standards specific to wireless power<br>May require some lobbying efforts to get approval of frequency authorities<br>May require standardised wireless power interface and frequency to achieve device compatibility<br>Standardisation efforts might be torpedoed by stakeholders of proximity systems |
| Implementation costs (BOM impact) | Lower<br>Very simple RX solutions possible<br>Lower Q-factor in base and RX<br>Tuning in RX not compulsory | Higher<br>High Q-factor required leading to higher voltages/ currents (physically larger components needed)<br>Precise tuning in base and RX compulsory<br>Wide-range adaptability in RX required |
| Impact on device design | Lower<br>Solutions with very low impact on device size/form factor and internal circuitry possible | Higher<br>Larger/more bulky antennas & likely more complex electronics required<br>More design constraints to preserve high Q-factor |
| Device positioning degree of freedom | Lower<br>No solution e.g. for wireless desktop applications | Higher<br>Attractive solutions e.g. for wireless desktop applications (e.g. for charging keyboard, mouse) |
| Multiple device powering/charging | Limited depending on size of pad and available transmit power | Less limited depending on available transmit power |

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other sizes, materials and connections can be used. Other structures can be used to receive the magnetic field. In general, an electric field can be used in place of the magnetic field, as the primary coupling mechanism. Other kinds of antennas can be used. Also, the inventors intend that only those claims which use the-words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. An apparatus for delivering power to a load via a wireless field, comprising:
    an antenna coil;
    a resonant circuit comprising said antenna coil and a capacitor in series with said antenna coil, said resonant circuit configured to receive power transmitted from a transmitter via a non-modulated wireless magnetic field at a frequency; and a power converting circuit, coupled to said antenna coil, the power converting circuit configured to receive a signal at a receive power level from the antenna coil and to convert the received signal to a charging signal, the charging signal having a voltage and current satisfying the requirements of a battery and sufficient to charge the battery, the power converting circuit configured to vary an impedance based on the received power level to tune the resonant circuit such that the resonant circuit resonates at the frequency.

2. The apparatus of claim 1, wherein the power converting circuit comprises:
a variable load impedance; and
a circuit configured to vary said variable load impedance based on the received power level.

3. The apparatus of claim 2, wherein the variable load impedance comprises at least one of a variable inductor or a variable capacitor.

4. The apparatus of claim 1, wherein the power converting circuit comprises a step-down or step-up converter.

5. The apparatus of claim 1, wherein the power converting circuit comprises a variable load impedance which includes at least one of a variable resistive component or a variable reactive component.

6. The apparatus of claim 1, wherein the power converting circuit comprises a synchronous rectifier configured to synchronously rectify AC power into DC power.

7. The apparatus as in claim 6, wherein the received power level varies with time, and wherein said synchronous rectifier includes a plurality of transistors configured to switch synchronously based on the received power level.

8. The apparatus of claim 1, wherein the impedance of the power converting circuit is variable such that the impedance value is configured to adjust coupling between the antenna coil and the transmitter.

9. The apparatus of claim 1, wherein the impedance of the power converting circuit is variable such that the impedance value is configured to adjust at least one of an operating frequency, a power level transmitted to the battery, or an efficiency level of power transmitted to the battery relative to power transmitted by the transmitter.

10. The apparatus as in claim 1, wherein said power converting circuit includes a fixed capacitor part and a variable capacitor part.

11. The apparatus as in claim 10, wherein said variable capacitor part includes a switched capacitor with multiple switchable parts, each of said switchable parts configured to vary the impedance.

12. The apparatus of claim 1, wherein said power converting circuit includes a mechanically adjustable ferrite core.

13. The apparatus as in claim 12, wherein said mechanically adjustable ferrite core has a portion thereof which is moved to change an inductance of said power converting circuit.

14. The apparatus as in claim 1, further comprising a circuit configured to apply a DC bias voltage to tune a capacitance level.

15. The apparatus as in claim 1, further comprising a circuit configured to apply a DC bias voltage to vary an inductance level.

16. The apparatus as in claim 1, wherein said power converting circuit includes an inductive component having a variable inductance, and wherein the inductive component is connected to the antenna coil, and connected to at least one switch configured to select one of a plurality of taps connected to said antenna coil.

17. A method comprising:
receiving power via a resonant circuit from a non-modulated wireless magnetic field at an operating frequency and at a receive power level;
converting the received power, so as to charge a battery, with a power converting circuit having an impedance value that is variable; and
varying the impedance value of the power converting circuit to tune the resonant frequency of the resonant circuit based on the received power level.

18. The method of claim 17, wherein varying the impedance of the power converting circuit comprises varying the impedance of at least one of a variable inductor or a variable capacitor.

19. The method of claim 17, wherein varying the impedance of the power converting circuit comprises varying the impedance of at least one of a variable resistive component or a variable reactive component.

20. The method of claim 17, wherein the power converting circuit comprises a synchronous rectifier configured to synchronously rectify AC power into DC power.

21. The method of claim 17, wherein varying the impedance of the power converting circuit comprises adjusting at least one of an operating frequency, a power level transmitted to the battery, or efficiency level of power transmitted to the battery relative to power received from the magnetic field.

22. The method of claim 17, wherein said power converting circuit includes a fixed capacitor part and a variable capacitor part.

23. The method of claim 22, wherein varying the impedance of the power converting circuit comprises operating a switchable part of a switchable capacitor part included in the variable capacitor part.

24. The method of claim 17, further comprising applying a DC bias voltage to tune at least one of a capacitance level or an inductance level.

25. An apparatus comprising:
means for receiving power via a resonant means from a non-modulated wireless magnetic field at an operating frequency and at a receive power level;
means for converting the received power, so as to charge a battery, the means for converting the received power having an impedance value that is variable; and
means for varying the impedance value of the means for converting the received power, to tune a resonant frequency of the resonant means based on the received power level.

26. The apparatus of claim 25, wherein the means for varying the impedance comprises means for varying the impedance of at least one of a variable inductor or a variable capacitor.

27. The apparatus of claim 25, wherein the means for converting the received power comprises a variable load impedance which includes at least one of variable resistive component or a variable reactive component.

28. The apparatus of claim 25, wherein the impedance of the means for converting the received power is variable such that the impedance value is adapted to adjust at least one of an operating frequency, a power level transmitted to the battery, and efficiency level of power transmitted to the battery relative to power received from the magnetic field.

29. The apparatus of claim 25, further comprising means for applying a DC bias voltage to tune at least one of a capacitance level or an inductance level.

* * * * *